(12) United States Patent
Yang et al.

(10) Patent No.: US 8,917,652 B2
(45) Date of Patent: Dec. 23, 2014

(54) METHOD, SYSTEM AND RELAY NODE FOR PROCESSING UPLINK CONTROL INFORMATION ON BACKHAUL LINK

(75) Inventors: Jin Yang, Shenzhen (CN); Feng Bi, Shenzhen (CN); Yifei Yuan, Shenzhen (CN); Ming Yuan, Shenzhen (CN); Shuanshuan Wu, Shenzhen (CN); Feng Liang, Shenzhen (CN)

(73) Assignee: ZTE Corporation (CN)

( * ) Notice: Subject to any disclaimer, the term of this patent is extended or adjusted under 35 U.S.C. 154(b) by 77 days.

(21) Appl. No.: 13/695,210

(22) PCT Filed: Apr. 21, 2011

(86) PCT No.: PCT/CN2011/073147
§ 371 (c)(1),
(2), (4) Date: Oct. 29, 2012

(87) PCT Pub. No.: WO2011/137717
PCT Pub. Date: Nov. 10, 2011

(65) Prior Publication Data
US 2013/0044721 A1    Feb. 21, 2013

(30) Foreign Application Priority Data
May 6, 2010  (CN) .......................... 2010 1 0178095

(51) Int. Cl.
H04B 7/185   (2006.01)
H04W 4/00    (2009.01)
(52) U.S. Cl.
USPC .......................................... 370/315; 370/328
(58) Field of Classification Search
USPC .................. 370/315, 317, 319, 328
See application file for complete search history.

(56) References Cited

U.S. PATENT DOCUMENTS

2010/0008294 A1*  1/2010  Palanki et al. ................. 370/328
2010/0034135 A1   2/2010  Kim et al.
(Continued)

FOREIGN PATENT DOCUMENTS

| CN | 101262691 | 9/2008 |
|---|---|---|
| CN | 101374015 | 2/2009 |
| CN | 101572585 | 11/2009 |

OTHER PUBLICATIONS

International Search Report for International Patent Application No. PCT/CN2011/073147, mailed Jul. 28, 2011.

(Continued)

Primary Examiner — Andrew Lee
(74) Attorney, Agent, or Firm — McAndrews, Held & Malloy, Ltd.

(57) ABSTRACT

The disclosure discloses a method, system and RN for processing UCI on a backhaul link. The method comprises that: the RN determines Q' which is the number of the coded modulation symbols of the backhaul UCI according to the number of SC-FDMA symbols occupied by a GP, wherein the GP comprises RN state switch time deltaT and/or the time interval deltat which is reserved for avoiding the interference caused by RN uplink transmission, and deltaT is the switch time required by the RN to switch from an uplink reception state to an uplink transmission state and/or from the uplink transmission state to the uplink reception state; and the RN codes the backhaul UCI into a $Q = Q' \times Q_m$ bits sequence, wherein $Q_m$ is the number of bits comprised in each coded modulation symbol in the modulation order of the backhaul uplink subframe. The disclosure improves the performance of the system.

17 Claims, 10 Drawing Sheets the RN determines Q' which is the number of the coded modulation symbols of the backhaul UCI according to the number of SC-FDMA symbols occupied by the GP — S402 the RN codes the backhaul UCI into a $Q = Q'^* Q_m$ bits sequence — S404

(56) References Cited

U.S. PATENT DOCUMENTS

| | | | |
|---|---|---|---|
| 2010/0098012 A1* | 4/2010 | Bala et al. | 370/329 |
| 2012/0026934 A1* | 2/2012 | Park et al. | 370/315 |
| 2012/0113831 A1* | 5/2012 | Pelletier et al. | 370/252 |
| 2012/0134306 A1* | 5/2012 | Cheng et al. | 370/281 |
| 2012/0142365 A1* | 6/2012 | Ahn et al. | 455/452.1 |
| 2012/0243511 A1* | 9/2012 | Lv et al. | 370/335 |
| 2012/0320852 A1* | 12/2012 | Seo et al. | 370/329 |
| 2013/0028192 A1* | 1/2013 | Cheng et al. | 370/328 |
| 2013/0077465 A1* | 3/2013 | Sasaki et al. | 370/208 |
| 2013/0230004 A1* | 9/2013 | Nam et al. | 370/329 |
| 2014/0056253 A1* | 2/2014 | Jang et al. | 370/329 |
| 2014/0071928 A1* | 3/2014 | Papasakellariou et al. | 370/329 |

OTHER PUBLICATIONS

ZTE. Discussion on Backhaul Uplink Control Channel. 3GPP TSG-RAN WGI #59bis, R1-100540. Jan. 18, 2010, http://www.3gpp.org/ftp/tsg_ran/WG1_RL1/TSGR1_59b/Docs/R1-100540.zip (.

* cited by examiner

Normal CP

Extended CP

METHOD, SYSTEM AND RELAY NODE FOR PROCESSING UPLINK CONTROL INFORMATION ON BACKHAUL LINK

FIELD OF THE INVENTION

The disclosure relates to the field of communication, and in particular to a method, a system and a Relay Node (RN) for processing backhaul Uplink Control Information (UCI).

BACKGROUND OF THE INVENTION

The relay technology can divide the traditional single-hop link into a plurality of multi-hop links. Since a distance of each hop is shortened, the path loss is reduced. Thus, it helps to improve the transmission quality, to enlarge the communication range, and thereby to provide more rapid and better services for users.

As shown in FIG. 1, in the network where the RN is introduced, the link between the evolved NodeB (eNB) and the Macro User Equipment (M-UE) in the network is called direct link; the link between the eNB and the RN is called backhaul link; and the link between the RN and the Relay User Equipment (R-UE) is called Access Link.

As shown in FIG. 2, in a Long Term Evolution (LTE) system, each radio frame is 10 ms and comprises 10 subframes. One subframe is 1 ms and is divided into two slots; and each slot is 0.5 ms. When the frame structure of the system adopts Normal Cyclic Prefix (Normal CP), each subframe contains 14 Single Carrier-Frequency Division Multiple Access (SC-FDMA) symbols. When the frame structure of the system adopts Extended Cyclic Prefix (Extended CP), each subframe contains 12 SC-FDMA symbols. The uplink physical resource is divided according to the unit of Resource Block (RB). In the time domain one RB is one slot, and in the frequency domain one RB is consecutive $N_{sc}^{RB}$ sub-carriers, wherein $N_{sc}^{RB}=12$ or 24.

On the direct link of the LTE system, the uplink physical control information of the M-UE comprises Hybrid Automatic Repeat Request (HARQ) feedback information which comprises ACK/NACK feedback relied on the reception condition of the service data which are sent from the eNB to M-UE, and channel quality report which comprises Channel Quality Indicator/Precoding Matrix Indicator/Rank Indication (CQI/PMI/RI). The CQI/PMI described below indicates CQI and/or PMI. When M-UE needs to transmit both the uplink service data and the UCI on the same subframe, the User Equipment (UE) multiplexes the UCI and the uplink service data according to the configuration, bears the multiplexed UCI and the uplink service data in the allocated Physical Uplink Shared Channel (PUSCH) resource and sends it to the eNB. The eNB allocates the PUSCH resource of the UE according to the unit of RB pair.

In the LTE system, the processing of multiplexing the UCI and the uplink service data and bearing the multiplexed UCI and the uplink service data on the PUSCH is that: respectively coding, multiplexing and interleaving the UCI to be reported, comprising one or more of the ACK/NACK, CQI/PMI and RI information; and finally mapping to the allocated PUSCH resource.

First, it is required to determine the number of coded modulation symbols Q' according to the relevant configuration and resource allocation of the uplink transmission of the UE configured by the eNB.

For the ACK/NACK or RI information, $$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$

where, O is the number of bits of ACK/NACK or RI control information; $M_{sc}^{PUSCH}$ is the number of sub-carriers of the PUSCH resource obtained by the RN for bearing the transmission block (TB) that bears the uplink service data on the current uplink subframe; $M_{sc}^{PUSCH-initial}$ is the number of the sub-carriers of the PUSCH resource allocated for the TB that bears the uplink service data of the initial transmission; the number of the SC-FDMA symbols capable of bearing the uplink service data on one subframe in the initial transmission configuration of the TB that bears the uplink service data of the direct link is $N_{symb}^{PUSCH-initial}=(2 \cdot (N_{symb}^{UL}-1)-N_{SRS})$; $N_{symb}^{UL}$ is the number of SC-FDMA symbols on each slot of the uplink; it is 7 when Normal CP is adopted, and is 6 when Extended CP is adopted; $N_{SRS}$ is the number of the SC-FDMA symbol occupied by the Sounding Reference Signal (SRS); C and $K_r$ are relevant parameters for the code block segmentation performed in the uplink service data processing, and specifically, $K_r$ is the number of bits contained in a corresponding code block r in code block segmentation performed for the TB that bears uplink service data; C is the total number of coded blocks after the code block segmentation performed for the TB that bears uplink service data; and $\beta_{offset}^{PUSCH}$ is the offset indication of the UCI modulation coding mode on the direct link; that is to say, when the UCI is borne on the PUSCH, the offset indication determining the number of bits of coded UCI contains 16 values, and the specifically adopted value is configured by a high-layer signalling. For the ACK/NACK information, $\beta_{offset}^{PUSCH}=\beta_{offset}^{HARQ-ACK}$; and for the RI information, $\beta_{offset}^{PUSCH}=\beta_{offset}^{RI}$. The parameter tables are as shown in Tables 1-3 below.

TABLE 1

$\beta_{offset}^{HARQ-ACK}$ parameter table

| $I_{offset}^{HARQ-ACK}$ | $\beta_{offset}^{HARQ-ACK}$ |
|---|---|
| 0 | 2.000 |
| 1 | 2.500 |
| 2 | 3.125 |
| 3 | 4.000 |
| 4 | 5.000 |
| 5 | 6.250 |
| 6 | 8.000 |
| 7 | 10.000 |
| 8 | 12.625 |
| 9 | 15.875 |
| 10 | 20.000 |
| 11 | 31.000 |
| 12 | 50.000 |
| 13 | 80.000 |
| 14 | 126.000 |
| 15 | Reserved |

TABLE 2

$\beta_{offset}^{RI}$ parameter table

| $I_{offset}^{RI}$ | $\beta_{offset}^{RI}$ |
|---|---|
| 0 | 1.250 |
| 1 | 1.625 |
| 2 | 2.000 |
| 3 | 2.500 |

TABLE 2-continued $\beta_{offset}^{RI}$ parameter table

| $I_{offset}^{RI}$ | $\beta_{offset}^{RI}$ |
|---|---|
| 4 | 3.125 |
| 5 | 4.000 |
| 6 | 5.000 |
| 7 | 6.250 |
| 8 | 8.000 |
| 9 | 10.000 |
| 10 | 12.625 |
| 11 | 15.875 |
| 12 | 20.000 |
| 13 | Reserved |
| 14 | Reserved |
| 15 | Reserved |

TABLE 3

$\beta_{offset}^{CQI}$ parameter table

| $I_{offset}^{CQI}$ | $\beta_{offset}^{CQI}$ |
|---|---|
| 0 | Reserved |
| 1 | Reserved |
| 2 | 1.125 |
| 3 | 1.250 |
| 4 | 1.375 |
| 5 | 1.625 |
| 6 | 1.750 |
| 7 | 2.000 |
| 8 | 2.250 |
| 9 | 2.500 |
| 10 | 2.875 |
| 11 | 3.125 |
| 12 | 3.500 |
| 13 | 4.000 |
| 14 | 5.000 |
| 15 | 6.250 |

After Q' is obtained, according to the configured modulation order, the UE can further determine the number of coded bits of the ACK/NACK or RI, $Q=Q_m \cdot Q'$, wherein $Q_m$ is the number of the bits borne by each SC-FDMA symbols in the current modulation order. Specifically, the $Q_m$ is respectively 2/4/6 at QPSK/16QA/64QAM.

For the CQI/PMI information, $$Q' = min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, M_{sc}^{PUSCH} \cdot N_{symb}^{PUSCH} - \frac{Q_{RI}}{Q_m}\right)$$

where, O is the number of bits of the CQI/PMI information; L is the number of bits of the CRC contained in the coded CQI/PMI information; $\beta_{offset}^{PUSCH}$ is the offset indication of the UCI modulation coding mode on the direct link; here $\beta_{offset}^{PUSCH} = \beta_{offset}^{CQI}$; $N_{symb}^{PUSCH}$ is the SC-FDMA symbols capable of bearing the uplink service data on a subframe of the current transmission configuration of the TB that bears the uplink service data on the direct link; $Q_{RI}$ is the number of bits of the coded and modulated RI information on the direct link; and other parameters have the same definitions as above.

The coded bits of UCI information and the uplink service data are further multiplexed and interleaved. The CQI/PMI information and the service data are multiplexed in seise, then interleaved integrally with the ACK/NACK and RI, and finally mapped to the allocated PUSCH resource through processes such as scrambling, modulation and the like, as shown in FIG. 3.

As the RN cannot perform the uplink reception of the Access Link and the uplink transmission of the backhaul link at the same time, the RN may need to arrange certain switch time interval between the Access Link subframe and the Backhaul Link subframe on which the signal switch from reception to transmission or from transmission to reception, so as converse. For the other aspect, in order to avoid interference from the RN uplink transmission to the uplink reception of other RNs, the RN may be configured to reserve some SC-FDMA symbols on the uplink subframe of the Backhaul as interference avoidance protection time. Transmission of uplink signals is not performed on these symbols. The subframe for the backhaul uplink transmission of RN, configured by the system, is called the backhaul uplink subframe. Considering at least one of the above two factors, the number of the symbols which can be practically used for the uplink transmission on the backhaul uplink subframe of the RN may be less than the number of the symbols contained in one subframe. That is to say, when Normal CP is adopted, the usable symbol number may be less than 14; and when Extended CP is adopted, the usable symbol number may be less than 12. As a result, the channel structure of the relay physical uplink shared channel (R-PUSCH) of the backhaul link is different from the PUSCH. Consequently, corresponding process of the direct link cannot be applied to the process of the UCI and the uplink service data of the backhaul link. Otherwise, the system performance may be reduced due to the mapping error.

In addition, in the multiplexing and mapping process of the UCI and the uplink service data of the backhaul link, the eNB needs to indicate the offset indication index of the UCI coding mode for the RN through a signalling with many bits, so the signalling overhead is relatively great.

SUMMARY OF THE INVENTION

The disclosure provides a method, a system and a RN for processing uplink control information on a backhaul link, so as to at least solving the problems mentioned above.

According to one aspect of the disclosure, a method for processing backhaul Uplink Control Information (UCI) is provided, comprising steps of: a Relay Node (RN) determining Q' which is the number of coded modulation symbols of the backhaul UCI according to the number of Single Carrier-Frequency Division Multiple Access (SC-FDMA) symbols occupied by a Guard Period (GP), wherein the GP comprises a RN state switch time $\Delta T$ and/or a time interval $\Delta t$ which is reserved for avoiding the interference caused by RN uplink transmission, and the $\Delta T$ is the switch time that the RN requires to switch from an uplink reception state to an uplink transmission state and/or from the uplink transmission state to the uplink reception state; and the RN coding the backhaul UCI into a $Q=Q' \times Q_m$ bits sequence, wherein $Q_m$ is the number of bits comprised in each coded modulation symbol in a modulation order of a backhaul uplink subframe.

When the UCI is ACK/NACK or Rank Indication (RI) information, determining the Q' according to the SC-FDMA occupied by the GP comprises: determining the number of the SC-FDMA symbols $N_{symb}^{R-PUSCH-initial}$ capable of bearing uplink service data on the initial backhaul uplink subframe transmission according to the number of the SC-FDMA symbols occupied by the GP; and determining the Q', $$Q' = \min\left(\left\lceil \frac{O \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, 4 \cdot M_{sc}^{R-PUSCH}\right),$$

wherein O is the number of bits of the ACK/NACK or the RI information; $M_{sc}^{R-PUSCH}$ is the number of sub-carriers of relay physical uplink shared channel (R-PUSCH) resource obtained by the RN for bearing a transmission block (TB) that bears uplink service data on a current uplink subframe; $M_{sc}^{R-PUSCH-initial}$ initial is the number of the sub-carriers of the R-PUSCH resource allocated for the TB that bears the uplink service data in an initial uplink subframe transmission; $K_r$ is the number of bits contained in a corresponding code block r in code block segmentation performed for the TB that bears the uplink service data; C is the total number of coded blocks after the code block segmentation performed for the TB that bears the uplink service data; and $\beta_{offset}^{R-PUSCH}$ is an offset indication of a UCI coding mode of the backhaul link.

When the UCI is Channel Quality Indicator/Precoding Matrix Indicator (CQI/PMI) information, determining the Q' according to the number of the SC-FDMA symbols occupied by the GP comprises: determining the number of the SC-FDMA symbols $N_{symb}^{R-PUSCH-initial}$ capable of bearing uplink service data on the initial backhaul uplink subframe transmission according to the number of the SC-FDMA symbols occupied by the GP; determining the number of the SC-FDMA symbols $N_{symb}^{R-PUSCH}$ capable of bearing the uplink service data on a current backhaul uplink subframe according to the number of SC-FDMA symbols occupied by the GP; and determining the Q', $$Q' = \min\left(\left\lceil \frac{(O+L) \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil,\right.$$
$$\left. M_{sc}^{R-PUSCH} \cdot N_{symb}^{R-PUSCH} - \frac{Q_{RI}}{Q_m}\right)$$

wherein O is the number of bits of the CQI/PMI information; L is the number of bits of a cyclic redundancy check (CRC) contained in a coded CQI/PMI information; $M_{sc}^{R-PUSCH}$ is the number of sub-carriers of R-PUSCH resource for bearing a TB that bears the uplink service data obtained by the RN on a current uplink subframe; $M_{sc}^{R-PUSCH-initial}$ is the number of the sub-carriers of the R-PUSCH resource allocated for the TB that bears the uplink service data in an initial uplink subframe transmission; $K_r$ is the number of bits contained in a corresponding code block r in code block segmentation performed for the TB that bears the uplink service data; C is the total number of coded blocks after the code block segmentation performed for the TB that bears the uplink service data; $Q_{RI}$ is the number of bits of coded RI information of the backhaul link; and $\beta_{offset}^{PUSCH}$ is an offset indication of a UCI coding mode of a backhaul link.

Determining the $N_{symb}^{R-PUSCH-initial}$ according to the number of the SC-FDMA symbols occupied by the GP comprises: $N_{symb}^{R-PUSCH-initial}=(2 \cdot (N_{symb}^{UL}-1)-N_{SRS}-N_{GP})$, wherein in the initial uplink subframe transmission, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by a Sounding Reference Signal (SRS) and is equal to 0 or 1.

Determining the $N_{symb}^{R-PUSCH}$ according to the SC-FDMA symbols occupied by the GP comprises: $N_{symb}^{R-PUSCH}=(2 \cdot (N_{symb}^{UL}-1)-N_{SRS}-N_{GP})$, wherein in a current backhaul uplink subframe, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by a SRS and is equal to 0 or 1.

The value range of the $N_{GP}$ is $[N_1, \ldots, N_i, \ldots, N_n]$, wherein $i=1, \ldots, n$, $0 \le n \le 13$, and $0 \le N_i \le 13$.

The value range of the $N_{GP}$ is $[N_1, \ldots, N_i, \ldots, N_n]$, wherein $i=1, \ldots, n$, $0 \le n \le 13$, and $0.5 \le N_i \le 13$.

According the other aspect of the disclosure, a method for processing backhaul Uplink Control Information (UCI) is provided, comprising steps of: an evolved NodeB (eNB) indicating a Relay Node (RN) an offset indication index $I_{R-offset}$ of a UCI coding mode of a backhaul link by a high-layer signalling, wherein the $I_{R-offset}$ contains M values, and M=2 or 4 or 8; the RN determining the value of an offset indication $\beta_{offset}^{PUSCH}$ of the UCI coding mode of the backhaul link corresponding to the $I_{R-offset}$ in an index reference table; the RN determining Q' which is the number of coded modulation symbols of the backhaul UCI according to the value of the $\beta_{offset}^{PUSCH}$; and the RN coding the backhaul UCI into a $Q=Q' \times Q_m$ bits sequence, wherein $Q_m$ is the number of bits comprised in each coded modulation symbol in a modulation order of a backhaul uplink subframe.

The backhaul UCI comprises at least one of: ACK/NACK, Rank Indication (RI), and Channel Quality Indicator/Precoding Matrix Indicator (CQI/PMI).

The UCI of the ACK/NACK, the UCI of the RI and the UCI of the CQI/PMI correspond to an index reference table respectively.

According to another aspect of the disclosure, a RN is provided, comprising a determination module, configured to determine Q' which is the number of coded modulation symbols of backhaul Uplink Control Information (UCI) according to the number of Single Carrier-Frequency Division Multiple Access (SC-FDMA) symbols occupied by a Guard Period (GP), wherein the GP comprises a RN state switch time ΔT and/or a time interval Δt which is reserved for avoiding the interference caused by RN uplink transmission, and the ΔT is the switch time that the RN requires to switch from an uplink reception state to an uplink transmission state and/or from the uplink transmission state to the uplink reception state; and a coding module, configured to codes the backhaul UCI into a $Q=Q' \times Q_m$ bits sequence, wherein $Q_m$ is the number of bits comprised in each coded modulation symbol in a modulation order of a backhaul uplink subframe.

When the UCI is ACK/NACK or Rank Indication (RI) information, the determination module comprises: a first determination module, configured to determine the number of the SC-FDMA symbols $N_{symb}^{R-PUSCH-initial}$ capable of bearing uplink service data on the initial backhaul uplink subframe transmission according to the number of the SC-FDMA symbols occupied by the GP; and a second determination module, configured to determine the Q', $$Q' = \min\left(\left\lceil \frac{O \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, 4 \cdot M_{sc}^{R-PUSCH}\right),$$

wherein O is the number of bits of the ACK/NACK or the RI information; $M_{sc}^{R\text{-}PUSCH}$ is the number of sub-carriers of relay physical uplink shared channel (R-PUSCH) resource obtained by the RN for bearing a transmission block (TB) that bears uplink service data on a current uplink subframe; $M_{sc}^{R\text{-}PUSCH\text{-}initial}$ is the number of the sub-carriers of the R-PUSCH resource allocated for the TB that bears the uplink service data in an initial uplink subframe transmission; $K_r$ is the number of bits contained in a corresponding code block r in code block segmentation performed for the TB that bears the uplink service data; C is the total number of coded blocks after the code block segmentation performed for the TB that bears the uplink service data; and $\beta_{offset}^{R\text{-}PUSCH}$ is an offset indication of a UCI coding mode of a backhaul link.

The first determination module is configured to determine $N_{symb}^{R\text{-}PUSCH\text{-}initial}=(2\cdot(N_{symb}^{UL}-1)-N_{SRS}-N_{GP})$, wherein in the initial uplink subframe transmission, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by the Sounding Reference Signal (SRS) and is equal to 0 or 1.

When the UCI is Channel Quality Indicator/Precoding Matrix Indicator (CQI/PMI) information, the determination module comprises: a third determination module, configured to determine the number of the SC-FDMA symbols $N_{symb}^{R\text{-}PUSCH\text{-}initial}$ capable of bearing uplink service data on the initial backhaul uplink subframe transmission according to the number of the SC-FDMA symbols occupied by the GP; and determine the number of the SC-FDMA symbols $N_{symb}^{R\text{-}PUSCH\text{-}initial}$ capable of bearing the uplink service data on a current backhaul uplink subframe according to the number of the SC-FDMA symbols occupied by the GP; and a fourth determination module, configured to determine the Q', $$Q' = \min\left(\left\lceil \frac{(O+L)\cdot M_{sc}^{R\text{-}PUSCH-initial}\cdot N_{symb}^{R\text{-}PUSCH-initial}\cdot \beta_{offset}^{R\text{-}PUSCH}}{\sum_{r=0}^{C-1} K_r} \right\rceil, M_{sc}^{R\text{-}PUSCH}\cdot N_{symb}^{R\text{-}PUSCH} - \frac{Q_{RI}}{Q_m}\right)$$

wherein O is the number of bits of the CQI/PMI information; L is the number of bits of a cyclic redundancy check (CRC) contained in a coded CQI/PMI information; $M_{sc}^{R\text{-}PUSCH}$ is the number of sub-carriers of R-PUSCH resource for bearing a TB that bears the uplink service data obtained by the RN on a current uplink subframe; $M_{sc}^{R\text{-}PUSCH\text{-}initial}$ is the number of the sub-carriers of the R-PUSCH resource allocated for the TB that bears the uplink service data in an initial uplink subframe transmission; $K_r$ is the number of bits contained in a corresponding code block r in code block segmentation performed for the TB that bears the uplink service data; C is the total number of coded blocks after the code block segmentation performed for the TB that bears the uplink service data; $Q_R$, is the number of bits of coded RI information of the backhaul link; and $\beta_{offset}^{PUSCH}$ is an offset indication of a UCI coding mode of a backhaul link.

The third determination module is configured to perform processes of: determining $N_{symb}^{R\text{-}PUSCH\text{-}initial}=(2\cdot(N_{symb}^{UL}-1)-N_{SRS}-N_{GP})$, wherein in the initial uplink subframe transmission, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by the Sounding Reference Signal (SRS) and is equal to 0 or 1; and determining $N_{symb}^{R\text{-}PUSCH\text{-}initial}=(2\cdot(N_{symb}^{UL}-1)-N_{SRS}-N_{GP})$, wherein in a current backhaul uplink subframe, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by the SRS and is equal to 0 or 1.

According to another aspect of the disclosure, a system for processing backhaul Uplink Control Information (UCI) is provided, comprising an eNB and a RN, wherein the eNB comprises: a configuration indication module, configured to configure the RN to indicate to the RN an offset indication index $I_{R\text{-}offset}$ of a UCI coding mode of a backhaul link, wherein the $I_{R\text{-}offset}$ contains M values, and M=2 or 4 or 8; and the RN comprises: an offset indication determination module, configured to determine the value of an offset indication $\beta_{offset}^{PUSCH}$ of the UCI coding mode of the backhaul link corresponding to the $I_{R\text{-}offset}$ in an index reference table; a determination module, configured to determine Q' which is the number of coded modulation symbols of the backhaul UCI according to the value of the $\beta_{offset}^{R\text{-}PUSCH}$; and a coding module, configured to code the backhaul UCI into a Q=Q'× $Q_m$ bits sequence, wherein $Q_m$ is the number of bits comprised in each coded modulation symbol in a modulation order of a backhaul uplink subframe.

Through the disclosure, the number of symbols of the backhaul UCI after coding and modulation is determined according to the number of the SC-FDMA symbols occupied by the GP. Alternatively, according to the 2 or 4 or 8 indexes comprised in the index reference table of the offset indication of the backhaul UCI modulation coding mode and the corresponding values, the value corresponding to the index number indicated by the eNB configuration is determined, and further the number of the coded modulation symbols of the backhaul UCI is determined according to the value. Finally, the backhaul UCI is coded into a bit sequence with a length of Q=Q'× $Q_m$. With this solution, the problem of the system performance reduction in the relevant technology is solved, and the system performance is improved.

BRIEF DESCRIPTION OF THE DRAWINGS

The drawings described herein are provided for further understanding of the disclosure and constitute a portion of the application. The schematic embodiments of the disclosure and the explanation thereof are used for explaining the disclosure, and do not constitute inappropriate limitation to the disclosure. In the drawings.

DETAILED DESCRIPTION OF THE EMBODIMENTS

The disclosure is illustrated hereinafter in detail with reference to the drawings and in combination with embodiments. It needs to be noted that the embodiments in the application and features in the embodiments can be combined with each other if there is no conflict.

In the network where the RN is introduced, the link between the eNB and the M-UE in the network is the direct link; the link between the eNB and the RN is the backhaul link; and the link between the RN and the R-UE is the Access Link. The embodiments of the disclosure are implemented in such a network.

Figure 1:
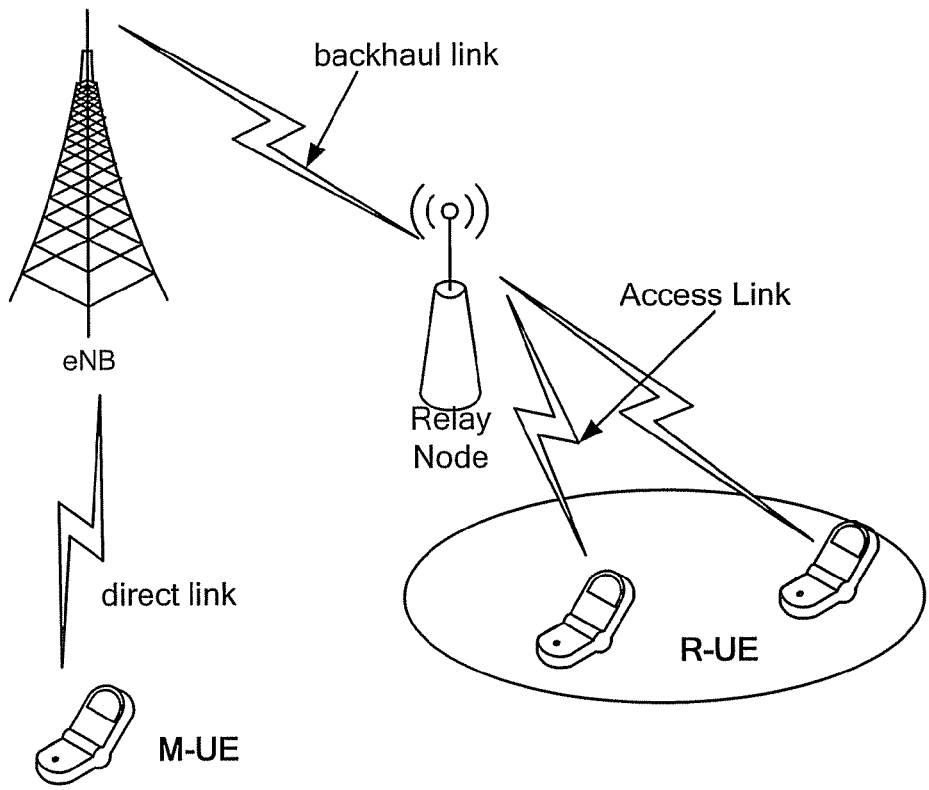
FIG. 1 shows a structural schematic diagram of a relay network according to relevant technology.
Figure 2:
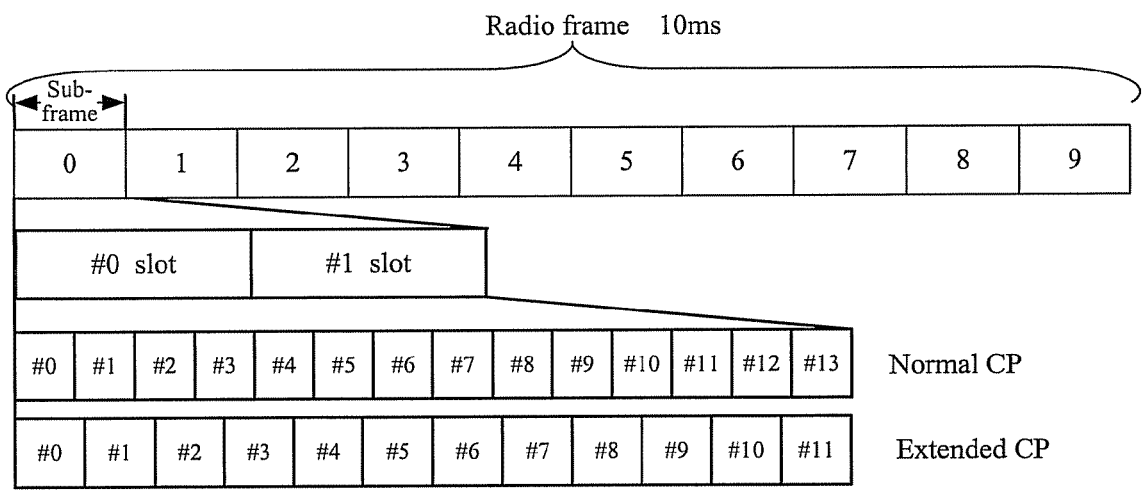
FIG. 2 shows a structural schematic diagram of a radio frame of an LTE system according to relevant technology.
Figure 3:
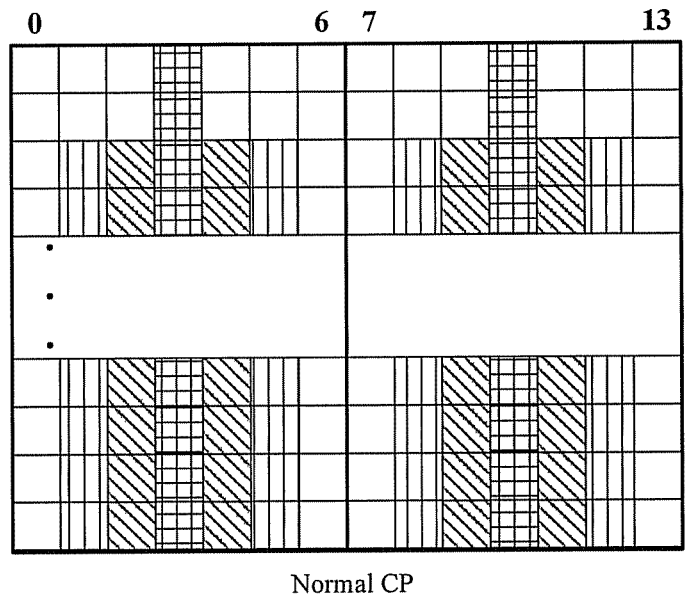
FIG. 3 shows a structural schematic diagram for bearing multiplexed UCI information and service data of an LTE system to a PUSCH according to relevant technology.
Figure 3:
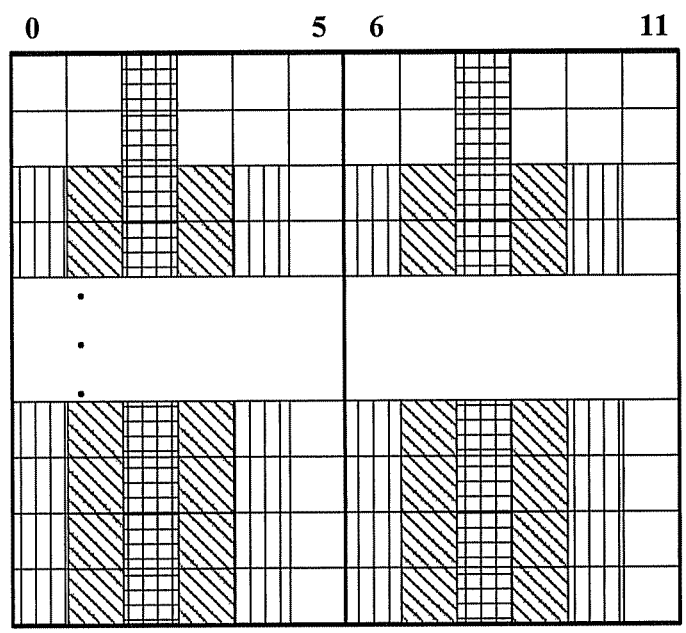
Figure 3:
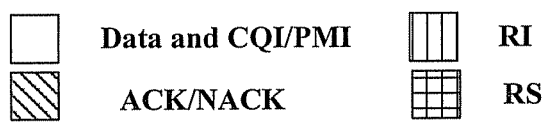
Figure 4:
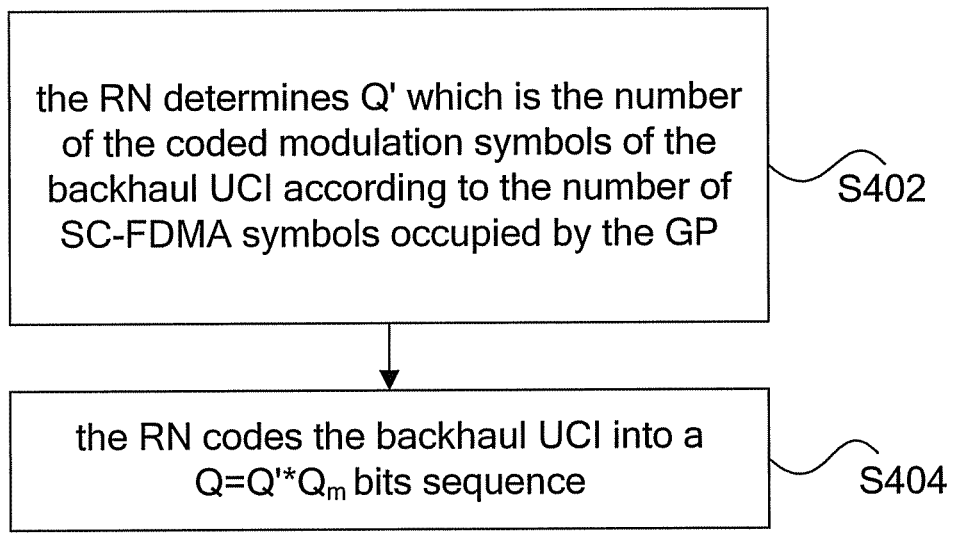
FIG. 4 shows a flowchart of a method for processing backhaul UCI according to an embodiment of the disclosure.

FIG. 4 shows a flowchart of a method for processing backhaul UCI according to an embodiment of the disclosure. The method comprises the following steps:

Step S402, the RN determines Q' which is the number of the coded modulation symbols of the backhaul UCI according to the number of SC-FDMA symbols occupied by the GP, wherein the GP comprises RN state switch time $\Delta T$ and/or the time interval $\Delta t$ which is reserved for avoiding the interference caused by RN uplink transmission, and $\Delta T$ is the switch time required by the RN to switch from an uplink reception state to an uplink transmission state and/or from the uplink transmission state to the uplink reception state; and Step S404, the RN codes the backhaul UCI into a Q=Q'× $Q_m$ bits sequence, wherein $Q_m$ is the number of bits comprised in each coded modulation symbol in the modulation order of the backhaul uplink subframe.

In relevant technology, as the RN cannot perform the uplink reception of the Access Link and the uplink transmission of the backhaul link at the same time, the RN needs to arrange certain switch time interval between Access Link subframe and the Backhaul Link subframe on which the signal switch from the reception to transmission or from transmission to reception, so as converse. On the backhaul uplink subframe configured by the system, the eNB configures the RN to indicate R-PUSCH resource (resource of the backhaul link) for the RN. On the allocated R-PUSCH resource, the RN has the uplink service data and the UCI which need to be reported to the eNB. The RN multiplexes the UCI and the uplink service data, carries the multiplexed UCI and the uplink service data on the allocated R-PUSCH resource and transmits the multiplexed UCI and the uplink service data to the eNB in uplink. On the uplink subframe of non-backhaul link, the RN receives the uplink signals from the R-UE on the Access Link. On the uplink resource of the system, the conversion between the reception/transmission state and transmission/reception state of the RN needs certain switch time interval. That is to say, certain $\Delta T$ may need to be set between the uplink subframe which serves the Access Link and the configured backhaul uplink subframe (the way to set $\Delta T$ and time length of $\Delta T$ is relevant to the system configuration of the backhaul uplink subframe, the time needed for the RN state conversion and the transmission timing of the backhaul uplink subframe). In addition, in order to avoid interference from the RN uplink transmission to the uplink reception of the other RNs, the RN may be configured to reserve some SC-FDMA symbols which are configured on the backhaul uplink subframe as interference avoidance protection time $\Delta t$. Transmission of uplink signals is not performed in $\Delta t$. The GP composed of the $\Delta T$ and/or $\Delta t$ will cause the channel structure of the PUSCH of the backhaul link to be different from the PUSCH. Under such circumstances, the method of the direct link is unavailable for the multiplexing and carrying processes of the backhaul UCI and uplink service data. The method provided by the embodiment of the disclosure determines the number of the UCI symbols which are modulated on the backhaul link according to the number of the SC-FDMA symbols occupied by the GP, and then after the coding, multiplexing, interleaving and modulating processes, maps the symbols to the allocated R-PUSCH resource of the backhaul link, and then sends the symbols to the eNB. The method of the disclosure adapts to the channel structure of the R-PUSCH of the backhaul link. That the RN bears the backhaul UCI to the R-PUSCH to be transmitted to the eNB is efficiently realized. The backhaul link channel condition is fully utilized, and the transmission efficiency of the backhaul UCI is improved. Thereby, the system performance is improved.

Preferably, when the UCI is the ACK/NACK or RI information, Step S402 comprises:

Step S4021, determining the number of the SC-FDMA symbols $N_{symb}^{R\text{-}PUSCH\text{-}initial}$ capable of bearing the uplink service data on the backhaul initial uplink subframe transmission, according to the number of the SC-FDMA symbols occupied by the GP; and Step S4023, determining the Q', $$Q' = \min\left(\left\lceil \frac{O \cdot M_{sc}^{R\text{-}PUSCH\text{-}initial} \cdot N_{symb}^{R\text{-}PUSCH\text{-}initial} \cdot \beta_{offset}^{R\text{-}PUSCH}}{\sum_{r=0}^{C-1} K_r} \right\rceil, 4 \cdot M_{sc}^{R\text{-}PUSCH}\right),$$

wherein O is the number of bits of the ACK/NACK or the RI information; $M_{sc}^{R\text{-}PUSCH}$ is the number of sub-carriers of R-PUSCH resource obtained by the RN for bearing the TB that bears the uplink service data on the current uplink subframe; $M_{sc}^{R\text{-}PUSCH\text{-}initial}$ is the number of the sub-carriers of the R-PUSCH resource allocated for the TB that bears the uplink service data in an initial uplink subframe transmission; $K_r$ is the number of bits contained in a corresponding code block r in code block segmentation performed for the TB that bears the uplink service data; C is the total number of coded blocks after the code block segmentation performed for the TB that bears the uplink service data; and $\beta_{offset}^{PUSCH}$ is an offset indication of a UCI coding mode of the backhaul link.

In the above, the $M_{sc}^{R\text{-}PUSCH\text{-}initial}$, the C and the $K_r$ can be obtained by the RN according to R-PDCCH corresponding to the corresponding TB that bears the uplink service data. If the uplink service data transmission is the half-static configuration, the $M_{sc}^{R\text{-}PUSCH\text{-}initial}$, the C and the Kr can also be obtained according to the corresponding most recently obtained R-PDCCH with the half-static configuration.

Through Step S4021, the influence from the number of the SC-FDMA symbols occupied by the GP to the channel structure of the PUSCH of the backhaul link is reflected in the parameter $N_{symb}^{R\text{-}PUSCH\text{-}initial}$. This solution makes little change on the conventional process, and thus is easy to realize.

Preferably, when the UCI is the CQI/PMI information, Step S402 comprises:

Step S4022, the number of the SC-FDMA symbols $N_{symb}^{R\text{-}PUSCH\text{-}initial}$ capable of bearing uplink service data on the backhaul initial uplink subframe transmission according to the number of the SC-FDMA symbols occupied by the GP; and determining the number of the SC-FDMA symbols $N_{symb}^{R\text{-}PUSCH}$ capable of bearing the uplink service data on the current backhaul uplink subframe according to the number of the SC-FDMA symbols occupied by the GP; and Step S4024, determining the Q', $$Q' = \min\left(\left\lceil \frac{(O+L) \cdot M_{sc}^{R\text{-}PUSCH\text{-}initial} \cdot N_{symb}^{R\text{-}PUSCH\text{-}initial} \cdot \beta_{offset}^{R\text{-}PUSCH}}{\sum_{r=0}^{C-1} K_r} \right\rceil, M_{sc}^{R\text{-}PUSCH} \cdot N_{symb}^{R\text{-}PUSCH} - \frac{Q_{RI}}{Q_m}\right)$$

wherein O is the number of bits of the CQI/PMI information; L is the number of bits of a cyclic redundancy check (CRC) contained in a coded CQI/PMI information; $M_{sc}^{R\text{-}PUSCH}$ is the number of sub-carriers of R-PUSCH resource obtained by the RN for bearing the TB that bears the uplink service data on the current uplink subframe; $M_{sc}^{R\text{-}PUSCH\text{-}initial}$ is the number of the sub-carriers of the R-PUSCH resource allocated for the TB that bears the uplink service data in the initial uplink subframe transmission; $K_r$ is the number of bits contained in a corresponding code block r in code block segmentation performed for the TB that bears the uplink service data; C is the total number of coded blocks after the code block segmentation performed for the TB that bears the uplink service data; $Q_{RI}$ is the number of bits of coded RI information of the backhaul link; and $\beta_{offset}^{PUSCH}$ is an offset indication of a UCI coding mode of the backhaul link.

Through Step S4022, the influence from the number of the SC-FDMA symbols occupied by the GP to the channel structure of the R-PUSCH of the backhaul link is reflected in the parameter $N_{symb}^{R\text{-}PUSCH\text{-}initial}$ and $N_{symb}^{R\text{-}PUSCH}$. This solution makes little change on the conventional process, and thus is easy to realize.

Preferably, determining the $N_{symb}^{R\text{-}PUSCH\text{-}initial}$ according to the number of the SC-FDMA symbols occupied by the GP in Steps S4021 and S4022 comprises: determining $N_{symb}^{R\text{-}PUSCH\text{-}initial}=(2 \cdot (N_{symb}^{UL}-1)-N_{SRS}-N_{GP})$, wherein in the initial uplink subframe transmission, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by the SRS and is equal to 0 or 1. This calculation method makes little change on the conventional process and is easy to realize.

Preferably, determining the $N_{symb}^{R\text{-}PUSCH}$ according to the SC-FDMA symbols occupied by the GP in Step S4022 comprises: determining $N_{symb}^{R\text{-}PUSCH}=(2 \cdot (N_{symb}^{UL}-1)-N_{SRS}-N_{GP})$, wherein in the current backhaul uplink subframe, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by the SRS and is equal to 0 or 1.

Preferably, the number $N_{GP}$ of the SC-FDMA symbols occupied by the GP, which the RN needs to perform the preset switching, is a non-negative integer. Specifically, the value range of the $N_{GP}$ is $[N_1, \ldots N_i, \ldots N_n]$, wherein i=1, ..., n, $0 \leq n \leq 13$, $0 \leq N_i \leq 13$. For example, the value range of the $N_{GP}$ is [0, 1], [0, 1, 2] or [0, 1, 3] etc.

Figure 5:
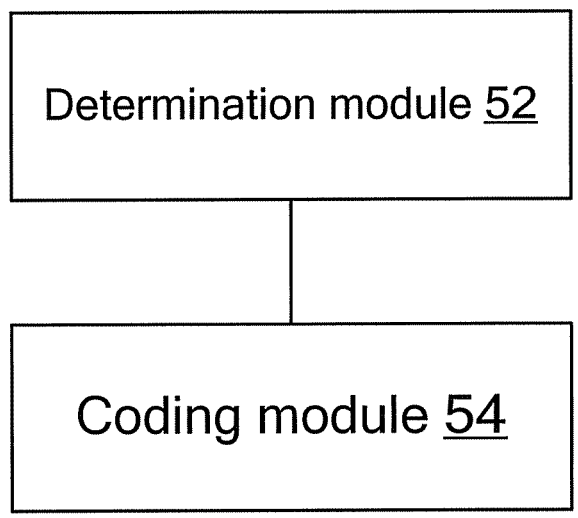
FIG. 5 shows a structural diagram of a RN according an embodiment of the disclosure.

FIG. 5 shows a structural diagram of a RN according an embodiment of the disclosure. The RN comprises a determination module 52, configured to determine Q', which is the number of the coded modulation symbols of the backhaul UCI, according to the number of the SC-FDMA symbols occupied by the GP, wherein the GP comprises a RN state switch time $\Delta T$ and/or a time interval $\Delta t$ which is reserved for avoiding the interference caused by RN uplink transmission, and the $\Delta T$ is the switch time that the RN requires to switch from an uplink reception state to an uplink transmission state and/or from the uplink transmission state to the uplink reception state; and a coding module 54, configured to codes the backhaul UCI into a Q=Q'×$Q_m$ bits sequence, wherein $Q_m$ is the number of bits comprised in each coded modulation symbol in a modulation order of a backhaul uplink subframe.

The RN provided by the embodiment of the disclosure determines the number of coded modulation symbols of the backhaul UCI according to the number of SC-FDMA symbols occupied by the GP through the determination module 52, then after the coding, multiplexing, interleaving and modulating processes, maps the symbols to the allocated R-PUSCH resource on the backhaul link, and then sends the symbols to the eNB. The RN of the disclosure is adapted to the channel structure of the physic uplink share channel of the backhaul link. That the RN bears the backhaul UCI to the R-PUSCH to be transmitted to the eNB is efficiently realized. The backhaul link channel condition is fully utilized, the transmission efficiency of the backhaul UCI is improved, and thereby, the system performance is improved.

Figure 6:
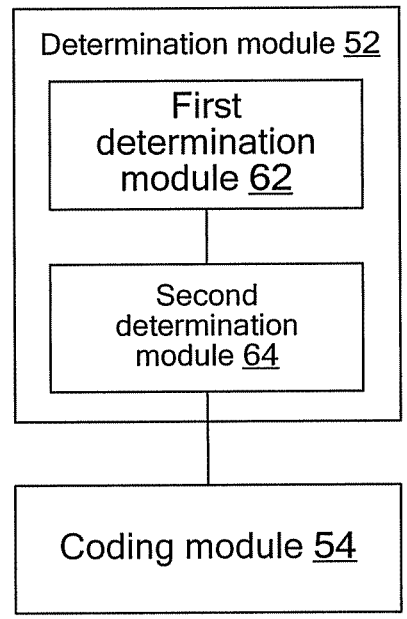
FIG. 6 shows a first preferred structural diagram of a RN according to an embodiment of the disclosure.

FIG. 6 shows a first preferred structural diagram of a RN according to an embodiment of the disclosure. As shown in FIG. 6, preferably, when the UCI is the ACK/NACK or RI information, the determination module 52 comprises: a first determination module 62, configured to determine the number of the SC-FDMA symbols $N_{symb}^{R\text{-}PUSCH\text{-}initial}$ capable of bearing uplink service data on the initial backhaul uplink subframe transmission according to the number of the SC-FDMA symbols occupied by the GP; and a second determination module 64, configured to determine the Q', $$Q' = \min\left(\left\lceil \frac{O \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, 4 \cdot M_{sc}^{R-PUSCH}\right),$$

wherein O is the number of bits of the ACK/NACK or the RI information; $M_{sc}^{R-PUSCH}$ is the number of sub-carriers of relay physical uplink shared channel (R-PUSCH) resource obtained by the RN for transmission block (TB) that bears uplink service data on a current uplink subframe; $M_{sc}^{R-PUSCH-initial}$ is the number of the sub-carriers of the R-PUSCH resource allocated for the TB that bears the uplink service data in an initial uplink subframe transmission; $K_r$ is the number of bits contained in a corresponding code block r in code block segmentation performed for the TB that bears the uplink service data; C is the total number of coded blocks after the code block segmentation performed for the TB that bears the uplink service data; and $\beta_{offset}^{R-PUSCH}$ is an offset indication of a UCI coding mode of the backhaul link.

Through the first determination module 62, the influence from the number of the SC-FDMA symbols occupied by the GP to the channel structure of the R-PUSCH of the backhaul link is reflected in the $N_{symb}^{R-PUSCH-initial}$. This implement makes little change on the conventional process and is easy to realize.

Preferably, the first determination module 62 is configured to determine $N_{symb}^{R-PUSCH-initial}=(2\cdot(N_{symb}^{UL}-1)-N_{SRS}-N_{GP})$, wherein in the current initial uplink subframe transmission, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by the SRS and is equal to 0 or 1.

Figure 7:
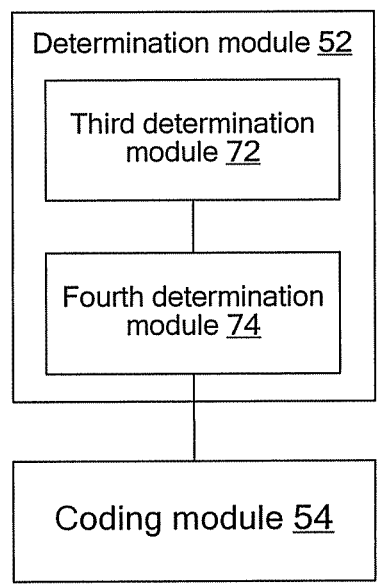
FIG. 7 shows a second preferred structural diagram of a RN according to an embodiment of the disclosure.

FIG. 7 shows a second preferred structural diagram of a RN according to an embodiment of the disclosure. As shown in FIG. 7, preferably, when the UCI is the CQI/PMI information, the determination module 52 comprises: a third determination module 72, configured to determine the number of the SC-FDMA symbols $N_{symb}^{R-PUSCH-initial}$ capable of bearing uplink service data on the initial backhaul uplink subframe transmission according to the number of the SC-FDMA symbols occupied by the GP; and determine the number of the SC-FDMA symbols $N_{symb}^{R-PUSCH}$ capable of bearing the uplink service data on a current backhaul uplink subframe according to the number of the SC-FDMA symbols occupied by the GP; and a fourth determination module 74, configured to determine the Q', $$Q' = \min\left(\left\lceil \frac{(O+L) \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil,\right.$$
$$\left. M_{sc}^{R-PUSCH} \cdot N_{symb}^{R-PUSCH} - \frac{Q_{RI}}{Q_m}\right),$$

wherein O is the number of bits of the CQI/PMI information; L is the number of bits of a cyclic redundancy check (CRC) contained in a coded CQI/PMI information; $M_{sc}^{R-PUSCH}$ is the number of sub-carriers of R-PUSCH resource obtained by the RN for bearing the TB that bears the uplink service data on a current uplink subframe; $M_{sc}^{R-PUSCH-initial}$ is the number of the sub-carriers of the R-PUSCH resource allocated for the TB that bears the uplink service data in an initial uplink subframe transmission; $K_r$ is the number of bits contained in a corresponding code block r in code block segmentation performed for the TB that bears the uplink service data; C is the total number of coded blocks after the code block segmentation performed for the TB that bears the uplink service data; $Q_{RI}$ is the number of bits of coded RI information of the backhaul link; and $\beta_{offset}^{R-PUSCH}$ is an offset indication of a UCI coding mode of the backhaul link.

Through the third determination module 72, the influence from the number of the SC-FDMA symbols occupied by the GP to the channel structure of the R-PUSCH of the backhaul link is reflected in the $N_{symb}^{R-PUSCH-initial}$ and $N_{symb}^{R-PUSCH}$. This implement makes little change on the conventional process and is easy to realize.

Preferably, the third determination module 72 is configured to perform the following processes: determining $N_{symb}^{R-PUSCH-initial}=(2\cdot(N_{symb}^{UL}-1)-N_{SRS}-N_{GP})$, wherein in the initial uplink subframe transmission, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by the Sounding Reference Signal (SRS) and is equal to 0 or 1; and determining $N_{symb}^{R-PUSCH}=(2\cdot(N_{symb}^{UL}-1)-N_{SRS}-N_{GP})$, wherein in a current backhaul uplink subframe, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by the SRS and is equal to 0 or 1.

The embodiments 1 to 4 described below combine the technical solution of preferred embodiments above.

Embodiment 1

In the process of processing the UCI on the backhaul link (backhaul UCI), when the UCI and the uplink service data are multiplexed to be borne on the R-PUSCH, the parameter $N_{symb}^{R-PUSCH-initial}$ for determining the number Q' of the coded modulation symbols after the coding and modulation is determined as: $N_{symb}^{R-PUSCH-initial}=(2\cdot(N_{symb}^{UL}-1)-N_{SRS}-N_{GP})$, wherein $N_{symb}^{UL}$ and the $N_{SRS}$ have the same definitions and values; the $N_{GP}$ indicates the GP, comprising the RN state switch time ΔT and/or the interference avoidance protection time Δt; the state switch time ΔT indicates the time that the RN requires to switch from an uplink reception state to an uplink transmission state and/or from the uplink transmission state to the uplink reception state; the interference avoidance protection time Δt indicates the time interval which is reserved for avoiding the interference caused by RN uplink transmission; and the RN does not perform the uplink signal transmission in the interference avoidance protection time Δt. The number of the SC-FDMA symbols occupied by the GP is a non-negative integer; and other processes for processing the UCI are same as that of the PUSCH.

In the above calculation formula, assuming that the relevant parameter configuration is as follows:

the system adopts the Normal CP, that is to say, $N_{symb}^{UL}=7$, the current uplink subframe is for the initial transmission of the TB that bears the uplink service data $N_{symb}^{R-PUSCH-initial}=N_{symb}^{R-PUSCH}$, the uplink subframe on which the configured R-PUSCH resource is allocated is not a macro-cell SRS subframe, that is, $N_{SRS}=0$, and the state switch time ΔT of the RN is one SC-FDMA symbol, and the interference avoidance time is not considered, that is to say, $N_{GP}=1$, then $N_{symb}^{R-PUSCH-initial}=(2 \cdot (N_{symb}^{UL}-1)-N_{SRS}-N_{GP})=11$.

Furthermore, the numbers of the symbols of the modulated the backhaul UCI $Q_{ACK}'$, $Q_{RI}'$ and $Q_{CQI}'$ are obtained according to the $N_{symb}^{R-PUSCH-initial}$:

$$Q'_{ACK} = Q'_{RI} = \min\left(\left\lceil \frac{O \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, 4 \cdot M_{sc}^{R-PUSCH}\right);$$

$$Q'_{CQI} = \min\left(\left\lceil \frac{(O+L) \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, \right.$$
$$\left. M_{sc}^{R-PUSCH} \cdot N_{symb}^{R-PUSCH} - \frac{Q_{RI}}{Q_m}\right).$$

Figure 8:
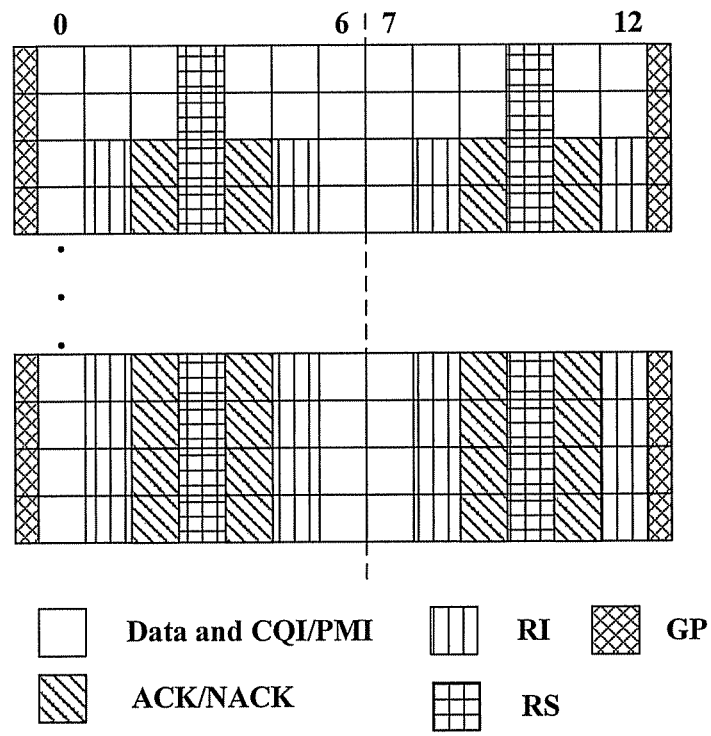
FIG. 8 shows a structural schematic diagram for bearing multiplexed UCI information and service data on R-PUSCH according to the first embodiment of the disclosure.
Figure 9:
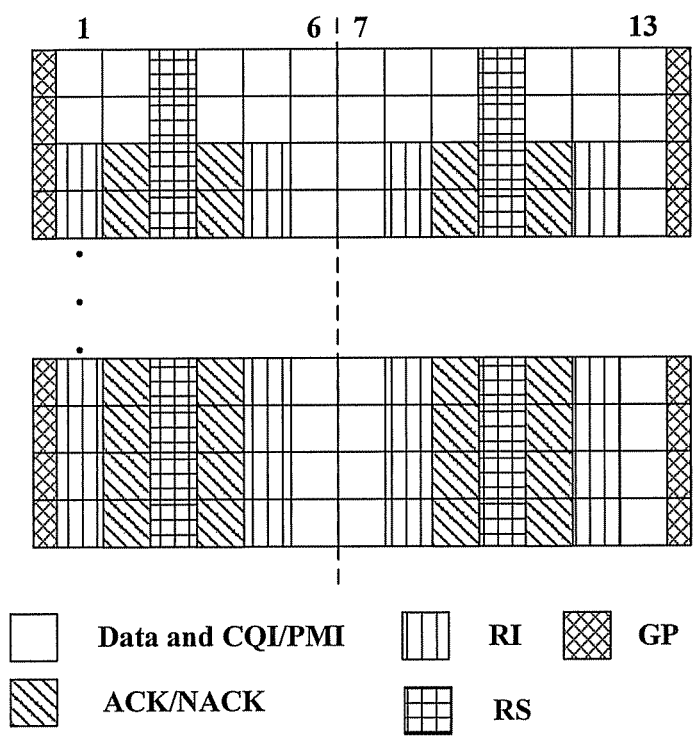
FIG. 9 shows another structural schematic diagram for bearing multiplexed UCI information and service data on R-PUSCH according to the first embodiment of the disclosure.

After the coding, multiplexing, interleaving and modulating processes, according to the mapping process for multiplexing the UCI to the PUSCH in the LTE protocol, the UCI and the uplink data are finally mapped to the allocated R-PUSCH resource. In this case, the RI is borne on the #1, #5, #8 and #12 symbols; the CQI/PMI information and the service data multiplexed in sense, are borne on the rest symbols; and the ACK/NACK information is borne on the #2, #3, #9 and #11 symbols. According to the system configuration of the Backhaul Uplink transmission timing relationship, the final mapping structure is as shown in FIG. 8 and FIG. 9. In FIG. 8, the state switch time intervals of the RN are respectively positioned at the beginning and the ending positions in the subframe. The two time intervals equal to one symbol and occupies the #13 symbol. The transmission of the RN is started from #0 symbol and is ended at the #12 symbol. In FIG. 9, the state switch time intervals of the RN are respectively positioned at the beginning and ending positions in the subframe. The two time intervals equal to one symbol and occupies the #0 symbol. The transmission of the RN is started from the #1 symbol and is ended at the #13 symbol.

Embodiment 2

In the above calculation formula, assuming that the relevant parameter configuration is as follows:

the system adopts the Extended CP, that is to say, $N_{symb}^{UL}=6$, the current uplink subframe is for the retransmission of the TB that bears the uplink service data, and the configuration of the uplink subframe for the initial transmission is as follows:

the uplink subframe on which the configured R-PUSCH resource is allocated is not a SRS subframe, that is, $N_{SRS}=0$;

the state switch time ΔT of the RN is 1 SC-FDMA symbol; and the interference avoidance time is not considered, that is to say, $N_{GP}=1$, then $N_{symb}^{R-PUSCH-initial}=(2 \cdot (N_{symb}^{UL}-1)-N_{SRS}-N_{GP})=9$.

The configuration of the current uplink subframe is as follows:

the uplink subframe on which the configured R-PUSCH resource is allocated is the SRS subframe, that is to say, $N_{SRS}=1$;

the state switch time ΔT of the RN is one SC-PUSCH symbol; and the interference avoidance time is not considered, that is to say, $N_{GP}=1$, then $N_{symb}^{R-PUSCH-initial}=(2 \cdot (N_{symb}^{UL}-1)-N_{SRS}-N_{GP})=8$.

Furthermore, the numbers of the symbols of the modulated the backhaul UCI $Q_{ACK}'$, $Q_{RI}'$ and $Q_{CQI}'$ are obtained according to the $N_{symb}^{R-PUSCH-initial}$:

$$Q'_{ACK} = Q'_{RI} = \min\left(\left\lceil \frac{O \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, 4 \cdot M_{sc}^{R-PUSCH}\right);$$

$$Q'_{CQI} = \min\left(\left\lceil \frac{(O+L) \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, \right.$$
$$\left. M_{sc}^{R-PUSCH} \cdot N_{symb}^{R-PUSCH} - \frac{Q_{RI}}{Q_m}\right).$$

Figure 10:
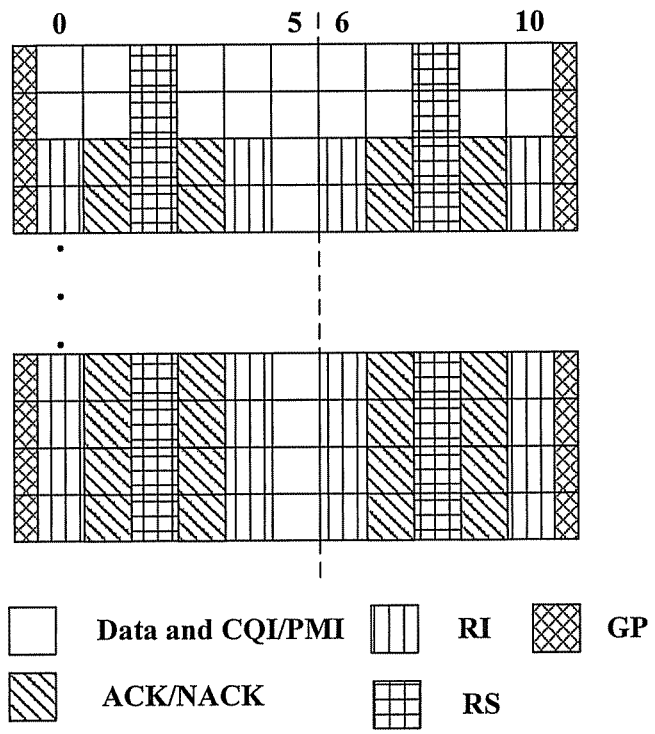
FIG. 10 shows a structural schematic diagram for bearing multiplexed UCI information and service data on R-PUSCH according to the second embodiment of the disclosure.
Figure 11:
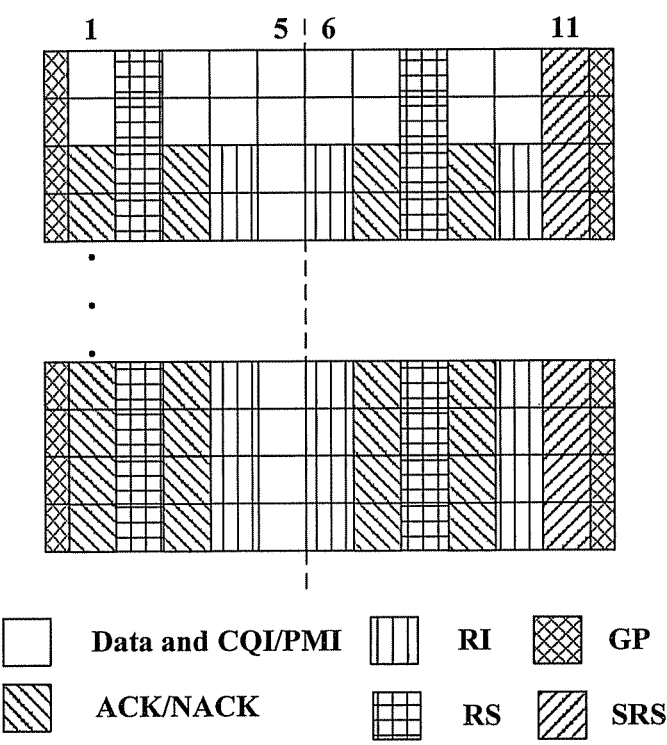
FIG. 11 shows another structural schematic diagram for bearing multiplexed UCI information and service data on R-PUSCH according to the second embodiment of the disclosure.

After the coding, multiplexing, interleaving and modulating processes, according to the mapping process for multiplexing the UCI to the PUSCH in the LTE protocol, the UCI and the uplink data are finally mapped to the allocated R-PUSCH resource. In this case the RI is borne on the #0, #4, #6 and #10 symbols; the CQI/PMI information and the service data multiplexed in sense, are borne on the rest symbols; and the ACK/NACK information is borne on the #1, #3, #7 and #9 symbols. According to the system configuration of the Backhaul Uplink transmission timing relationship, the final mapping structure is as shown in FIG. 10 and FIG. 11. In FIG. 10, the state switch time intervals of the RN are respectively positioned at the beginning and the ending positions in the subframe. The two time intervals equal to one symbol and occupies the #11 symbol. The transmission of the RN is started from #0 symbol and is ended at the #10 symbol. In FIG. 9, the state switch time intervals of the RN are respectively positioned at the beginning and ending positions in the subframe. The two time intervals equal to one symbol and occupies the #0 symbol. The transmission of the RN is started from the #1 symbol and is ended at the #11 symbol. The RI information mapped to the #0 symbol is not transmitted; and the #11 symbol maps the SRS signal of the RN.

Embodiment 3

In the above calculation formula, assuming that the relevant parameter configuration is as follows:

the system adopts the Normal CP, that is to say, $N_{symb}^{UL}=7$, the current uplink subframe is for the initial transmission of the TB that bears the uplink service data $N_{symb}^{R-PUSCH-initial}=N_{symb}^{R-PUSCH}$, the uplink subframe on which the configured R-PUSCH resource is allocated is not a macro-cell SRS subframe, that is, $N_{SRS}=0$, and the state switch time ΔT and the interference avoidance time Δt of the RN occupy two SC-FDMA symbols, that is to say, $N_{GP}=2$, then $N_{symb}^{R-PUSCH-initial}=(2 \cdot (N_{symb}^{UL}-1)-N_{SRS}-N_{GP})=10$.

Furthermore, the numbers of the symbols of the modulated the backhaul UCI $Q_{ACK}'$, $Q_{RI}'$ and $Q_{CQI}'$ are obtained according to the $N_{symb}^{R-PUSCH-initial}$:

$$Q'_{ACK} = Q'_{RI} = \min\left(\left\lceil \frac{O \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, 4 \cdot M_{sc}^{R-PUSCH}\right);$$

$$Q'_{CQI} = \min\left(\left\lceil \frac{(O+L) \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil,\right.$$

$$\left. M_{sc}^{R-PUSCH} \cdot N_{symb}^{R-PUSCH} - \frac{Q_{RI}}{Q_m}\right).$$

Figure 12:
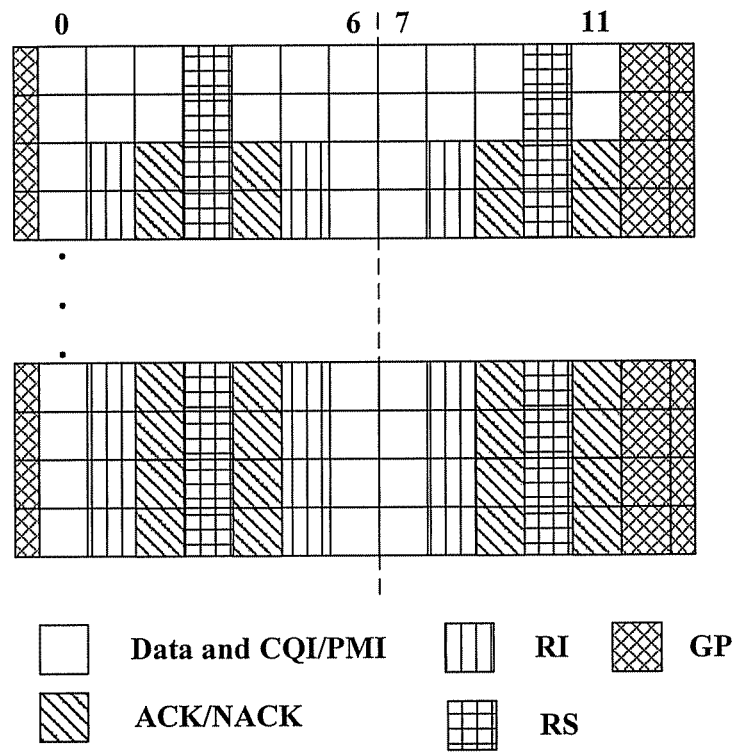
FIG. 12 shows a structural schematic diagram for bearing multiplexed UCI information and service data on R-PUSCH according to the third embodiment of the disclosure.
Figure 13:
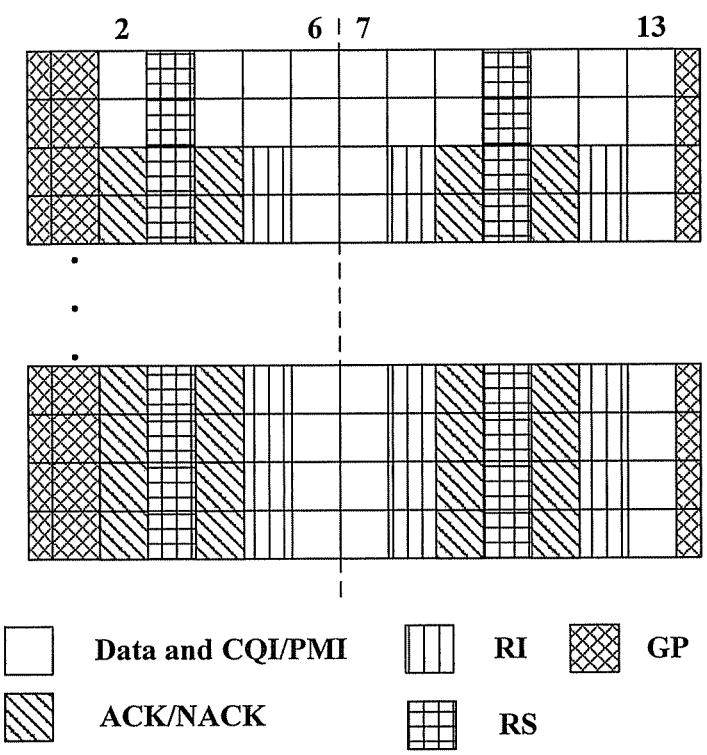
FIG. 13 shows another structural schematic diagram for bearing multiplexed UCI information and service data on R-PUSCH according to the third embodiment of the disclosure.

After the coding, multiplexing, interleaving and modulating processes, according to the mapping process for multiplexing the UCI to the PUSCH in the LTE protocol, the UCI and the uplink data are finally mapped to the allocated R-PUSCH resource. In this case, the RI is borne on the #1, #5, #8 and #12 symbols; the CQI/PMI information and the service data multiplexed in sense, are borne on the rest symbols; and the ACK/NACK information is borne on the #2, #3, #9 and #11 symbols. According to the system configuration of the Backhaul Uplink transmission timing relationship, the final mapping structure is as shown in FIG. 12 and FIG. 13. In FIG. 12, the state switch time intervals of the RN are respectively positioned at the beginning and the ending positions in the subframe. The interference avoidance time interval is positioned at the ending part of the subframe. The GP occupies two symbols of the #12 symbol and the #13 symbol. The transmission of the RN is started from the #0 symbol and is ended at the #11 symbol. The RI information mapped on the #12 symbol is not transmitted. In FIG. 13, the state switch time interval of the RN is respectively positioned at the beginning and ending positions in the subframe. The interference avoidance time interval is positioned at the beginning part of the subframe. The GP occupies two symbols of the #0 symbol and the #1 symbol. The transmission of the RN is started from the #2 symbol and is ended at the #13 symbol. The RI information mapped on the #1 symbol is not transmitted.

Embodiment 4

In the above calculation formula, assuming that the relevant parameter configuration is as follows:

the system adopts the Normal CP, that is to say, $N_{symb}^{UL}=7$, the current uplink subframe is for the initial transmission of the TB that bears the uplink service data $N_{symb}^{R-PUSCH-initial}=N_{symb}^{R-PUSCH}$, the uplink subframe on which the configured R-PUSCH resource allocating is a macro-cell SRS subframe, that is to say, $N_{SRS}=1$, the state switching of the RN is performed at time other than the current uplink subframe, so that the switch time interval in the current subframe $\Delta T=0$, and the interference avoidance time $\Delta t$ occupies one SC-FDMA symbol, that is to say, $N_{GP}=1$, then $N_{symb}^{R-PUSCH-initial}=(2\cdot N_{symb}^{UL}-1)-N_{SRS}-N_{GP})=10$.

Figure 14:
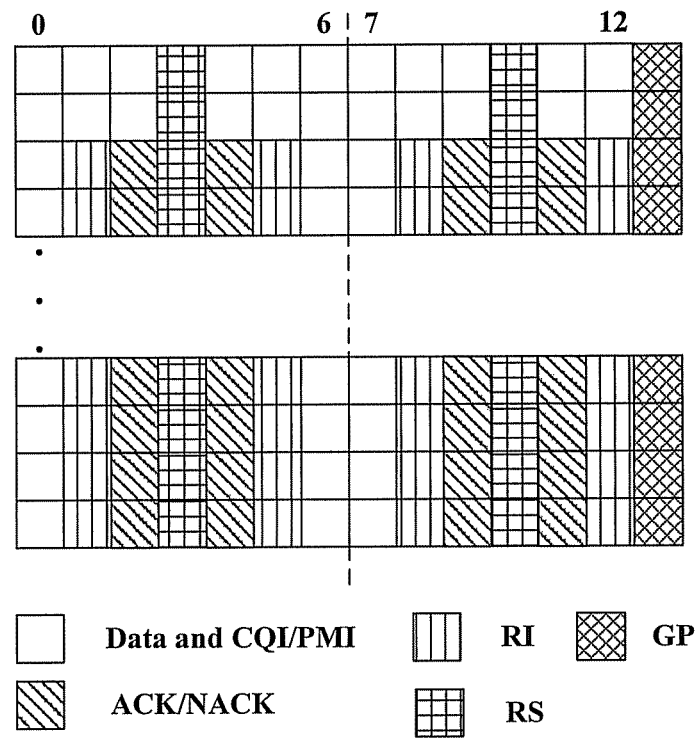
FIG. 14 shows a structural schematic diagram for bearing multiplexed UCI information and service data on R-PUSCH according to the fourth embodiment of the disclosure.
Figure 15:
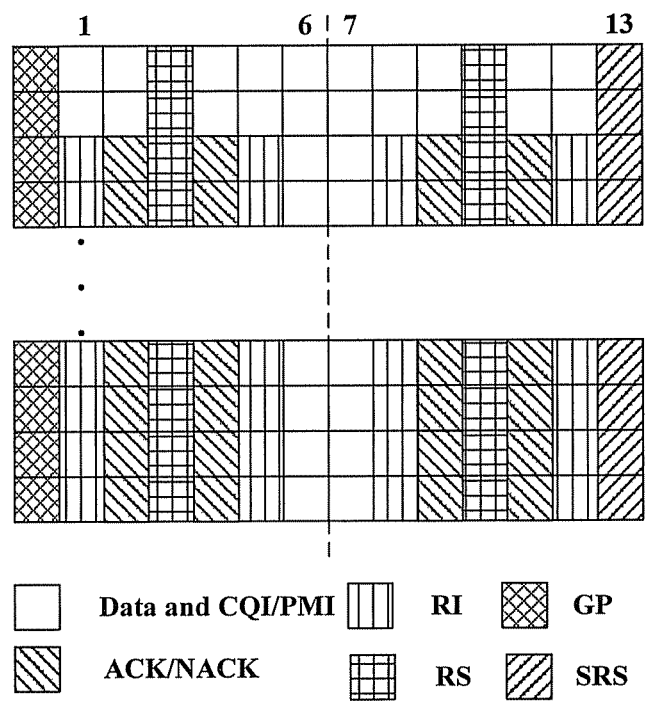
FIG. 15 shows another structural schematic diagram for bearing multiplexed UCI information and service data on R-PUSCH according to the fourth embodiment of the disclosure.

Furthermore, the numbers of the symbols of the modulated the backhaul UCI $Q_{ACK}'$, $Q_{RI}'$ and $Q_{CQI}'$ are obtained according to the $N_{symb}^{R-PUSCH-initial}$:

After the coding, multiplexing, interleaving and modulating processes, according to the mapping process for multiplexing the UCI to the PUSCH in the LTE protocol, the UCI and the uplink data are finally mapped to the allocated R-PUSCH resource. In this case, the RI is borne on the #1, #5, #8 and #12 symbols. The CQI/PMI information and the service data multiplexed in sense, are borne on the rest symbols. The ACK/NACK information is borne on the #2, #3, #9 and #11 symbols. According to the system configuration of the Backhaul Uplink transmission timing relationship, the final mapping structure is as shown in FIG. 14 and FIG. 15. In FIG. 14, the interference avoidance time interval is positioned at the ending part of the subframe, occupies the #13 symbol. The transmission of the RN is started from #0 symbol and ended by #12 symbol. In FIG. 15, the interference avoidance time interval is positioned at the beginning part of the subframe, occupies the #0 symbol. The transmission of the RN is started from the #1 symbol and is ended at the #13 symbol. The #13 symbol maps the SRS of the RN.

Figure 16:
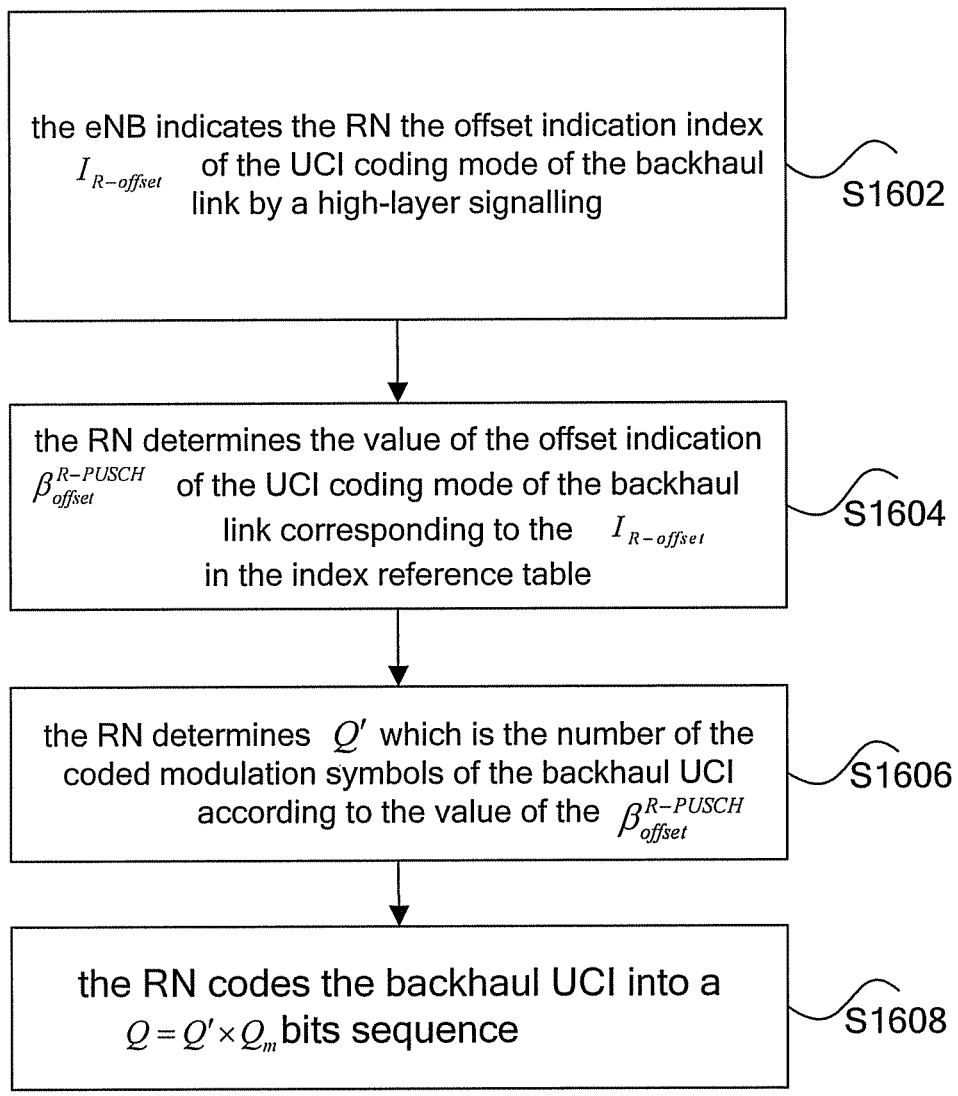
FIG. 16 shows a flowchart of another method for processing backhaul UCI according to an embodiment of the disclosure.

FIG. 16 shows a flowchart of another method for processing backhaul UCI according to an embodiment of the disclosure. The method comprises the following steps:

Step S1602, the eNB indicating the RN the offset indication index $I_{R-offset}$ of the UCI coding mode of the backhaul link by a high-layer signalling, wherein the $I_{R-offset}$ contains M values, and M=2 or 4 or 8;

Step S1604, the RN determines the value of the offset indication $\beta_{offset}^{PUSCH}$ of the UCI coding mode of the backhaul link corresponding to the $I_{R-offset}$ in the index reference table;

Step S1606, the RN determines Q' which is the number of the coded modulation symbols of the backhaul UCI according to the value of the $\beta_{offset}^{PUSCH}$; and Step S1608, the RN codes the backhaul UCI into a Q=Q'× $Q_m$ bits sequence, wherein $Q_m$ is the number of bits comprised in each coded modulated symbol in the modulation order of the backhaul uplink subframe.

In relevant technology, the offset indication of the UCI modulation coding mode contains 16 indexes and the corresponding values. When the network side indicates the index value to the RN, at least a signalling of 4 bits is required for carrying the index value. Hence, the signalling overhead is very high. In the embodiment of the disclosure, considering that the link quality of the backhaul link between the RN and the eNB is better than the quality of the direct link between the M-UE and the eNB, and the requirements on the value range in the offset indication of the UCI modulation coding mode and the value span among different values are reduced, so that the number M of the values contained in the offset indication of the UCI modulation coding mode is less than 16. The method reduces the number of the offset indication indexes and corresponding values of the adopted UCI modulation coding mode and further reduces the overhead of the signalling used for indicating the index value, and thereby improves the system performance.

In the above, the M=2 or 4 or 8. The M is set as a positive integer power of 2. The bits for indicating the state identification is fully utilized, so that as many as possible states of the offset indication of the UCI modulation coding mode can be provided.

Preferably, the offset indication index number of the UCI coding mode of the backhaul link is indicated by the eNB through high-layer signalling.

Preferably, the backhaul UCI comprises at least one of the follows: ACK/NACK, RI, and CQI/PMI.

Preferably, the UCI of the ACK/NACK, the UCI of RI and the UCI of CQI/PMI correspond to one offset indication index reference table respectively.

Figure 17:
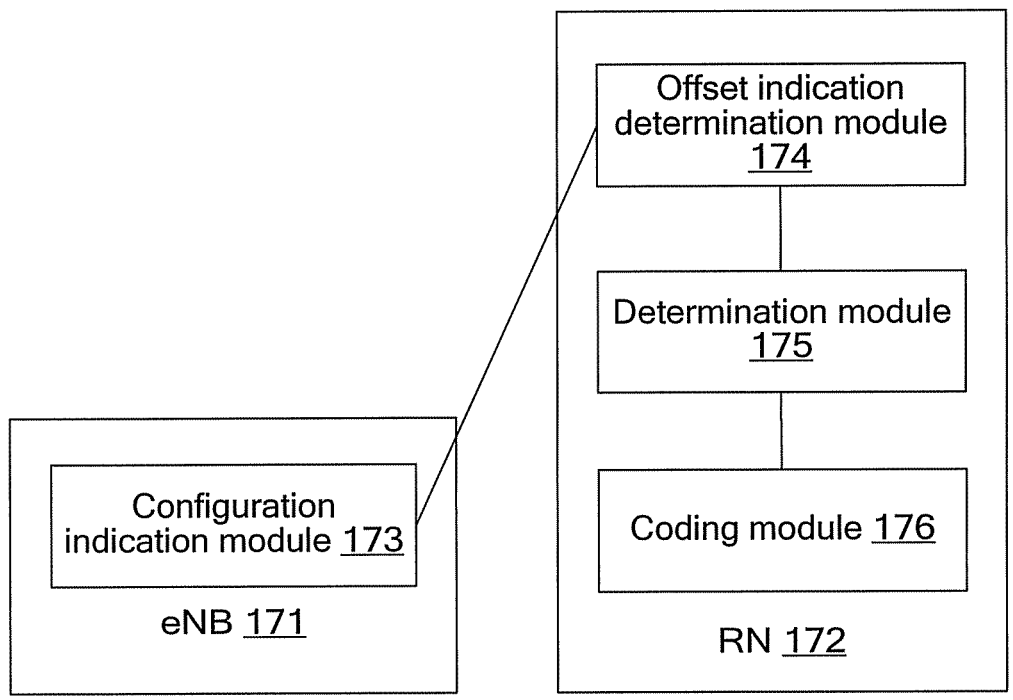
FIG. 17 shows a structural diagram of a system for processing backhaul UCI according to an embodiment of the disclosure.

FIG. 17 shows a structural diagram of a system for processing backhaul UCI according to an embodiment of the disclosure. The system comprises the eNB 171 and the RN 172. The eNB 171 comprises a configuration indication module 173, configured to configure the RN to indicate to the RN an offset indication index $I_{R\text{-}offset}$ of a UCI coding mode of the backhaul link, wherein the $I_{R\text{-}offset}$ contains M values, and M=2 or 4 or 8. The RN 172 comprises an offset indication determination module 174, configured to determine the value of an offset indication of the UCI coding mode of the backhaul link $\beta_{offset}^{PUSCH}$ corresponding to the $I_{R\text{-}offset}$ in an index reference table; a determination module 175, configured to determine Q' which is the number of coded modulation symbols of the backhaul UCI according to the value of the $\beta_{offset}^{PUSCH}$; and a coding module 176, configured to code the backhaul UCI into a $Q=Q' \times Q_m$ bits sequence, wherein $Q_m$ is the number of bits comprised in each coded modulation symbol in a modulation order of a backhaul uplink subframe.

In the system, the number of the values contained in the offset indication of the UCI modulation coding mode is less than 16. The offset indication determination module 174 determines the value corresponding to the received index in the 2 or 4 or 8 indexes and corresponding values contained in the index reference table. Thus, the number of values of the offset indication of the adopted UCI modulation coding mode is reduced. Further, the overhead of the signalling used for indicating the index value is reduced, and the system performance is improved.

The embodiment 5 described below combines the technical solution of a plurality of preferred embodiments above.

Embodiment 5

In the processing of the UCI information on the backhaul link, the eNB indicates the RN the indication indexes $I_{R\text{-}offset}^{HARQ\text{-}ACK}$, $I_{R\text{-}offset}^{RI}$ and $I_{R\text{-}offset}^{CQI}$, corresponding to the ACK/NACK, RI and CQI/PMI information respectively through high-layer signalling. The $I_{R\text{-}offset}$ in each index reference table contains M values. The RN determines the value of the offset indication $\beta_{offset}^{PUSCH}$ of the corresponding UCI coding mode of the backhaul link according to the $I_{R\text{-}offset}$ and the index reference table. And, M=2 or 4 or 8.

The RN determines the Q' which is the number of the coded modulation symbols of the backhaul UCI according to the value of the $\beta_{offset}^{PUSCH}$ and codes the backhaul UCI into a Q bits sequence. Then, after the coding, multiplexing, interleaving and modulating processes, the RN maps the bit sequence to the allocated R-PUSCH resource of the backhaul link and sends to the eNB.

The symbol number $Q'=Q/Q_m$, wherein the $Q_m$ is the number of bits comprised in each modulated symbol in the modulation order of the backhaul uplink subframe.

The illustration below is made by taking M=8 as an example.

The offset indication parameter $\beta_{offset}^{PUSCH}$ of the UCI coding mode of the backhaul link contains eight values. The eNB indicates the offset indication index $I_{R\text{-}offset}$ of the UCI coding mode of the backhaul link through the high-lay signalling. The specific values of the $\beta_{offset}^{PUSCH}$ of the UCI of ACK/NACK, RI and CQI/PMI on the corresponding backhaul link, that is, $\beta_{offset}^{R\text{-}ACK}$, $\beta_{offset}^{R\text{-}CQI}$ and $\beta_{offset}^{R\text{-}RI}$, are obtained according to the following index reference table. The examples of the index reference table are as follows:

TABLE 4

$\beta_{offset}^{R\text{-}ACK}$ index reference table

| $I_{offset}^{R\text{-}ACK}$ | $\beta_{offset}^{R\text{-}ACK}$ |
|---|---|
| 0 | 2.000 |
| 1 | 2.500 |
| 2 | 4.000 |
| 3 | 8.000 |
| 4 | 10.000 |
| 5 | 12.625 |
| 6 | 15.875 |
| 7 | 20.000 |

TABLE 5

$\beta_{offset}^{R\text{-}RI}$ index reference table

| $I_{offset}^{R\text{-}RI}$ | $\beta_{offset}^{R\text{-}RI}$ |
|---|---|
| 0 | 1.250 |
| 1 | 2.000 |
| 2 | 4.000 |
| 3 | 8.000 |
| 4 | 10.000 |
| 5 | 12.625 |
| 6 | 15.875 |
| 7 | 20.000 |

TABLE 6

$\beta_{offset}^{R\text{-}CQI}$ index reference table

| $I_{offset}^{R\text{-}CQI}$ | $\beta_{offset}^{R\text{-}CQI}$ |
|---|---|
| 0 | 1.250 |
| 1 | 1.750 |
| 2 | 2.000 |
| 3 | 2.500 |
| 4 | 4.000 |
| 5 | 6.250 |
| 6 | Reserved |
| 7 | Reserved |

In the above, the high-layer signalling configuration index numbers of the ACK/NACK, RI, and CQI/PMI are shown as $I_{offset}^{R\text{-}ACK}$, $I_{offset}^{R\text{-}RI}$ and $I_{offset}^{R\text{-}CQI}$ respectively. The specific corresponding relationship between the index numbers and the parameter values $\beta_{offset}^{R\text{-}ACK}$, $\beta_{offset}^{R\text{-}RI}$ and $\beta_{offset}^{R\text{-}CQI}$ are shown in the Table 4, the Table 5 and the Table 6 respectively. The Tables comprise corresponding offset indication parameter values respectively set for the values 0-7 of the index numbers. Some index numbers can be set as "reserved", which means this index number does not correspond to any specific parameter value. For example, in the $\beta_{offset}^{R-CQI}$ Table, the values 6 and 7 of the $\beta_{offset}^{R-CQI}$ are in the "reserved" state.

Based on the offset indication index reference table of the UCI coding mode of the backhaul link, the RN inquires the Table according to the corresponding index $I_{R-offset}$ indicated by the eNB through the high-layer signalling, so as to obtain the configured $\beta_{offset}^{R-PUSCH}$ value. Further, the RN obtains the number of symbols Q' of the corresponding modulated control information according to the parameter $\beta_{offset}^{R-PUSCH}$. And, after performing the coding, multiplexing, interleaving and modulating processes on the UCI to be reported, the RN maps the UCI and the uplink data to the allocated resource according to the method in the conventional protocol, and transmits the signal to the eNB on uplink.

In conclusion, the solution provided by the embodiment of the disclosure improves the transmission efficiency of the backhaul UCI, reduces the overhead of the signalling used for indicating the state identification, and improves the system performance.

It needs to be noted that the steps shown in the flowcharts of the drawings can be performed in a computer system with a group of computer executable commands. Meanwhile, although the logic sequences are shown in the flowcharts, in some cases the shown or described steps can be performed according to the sequences different from those mentioned herein.

Obviously, those skilled in the art should understand that each module or each step of the disclosure can be realized by a universal calculation device. The modules or steps can be integrated on single calculation device or allocated on a network which is composed of a plurality of the calculation devices. Optionally, the modules or steps can be realized by the program codes executable by the calculation device. Thus, the modules or steps can be stored in a storage device to be performed by the calculation device; or the modules or steps are respectively made into various integrated circuit modules; or a plurality of modules or steps of all the modules or steps can be made into single integrated circuit module for the realization. Thus, the disclosure is not limited to the combination of any special hardware and software.

The above is only the preferred embodiment of the disclosure and is not intended to limit the disclosure. For those skilled in the art, the disclosure may have various changes and modifications. Any modifications, equivalent replacements, improvements and the like within the scope of spirit and principle of the disclosure shall fall within the scope of protection of the disclosure.

What is claimed is:

1. A method for processing backhaul Uplink Control Information (UCI), comprising:
a Relay Node (RN) determining Q' which is the number of coded modulation symbols of the backhaul UCI according to the number of Single Carrier-Frequency Division Multiple Access (SC-FDMA) symbols occupied by a Guard Period (GP), wherein the GP comprises a RN state switch time ΔT and/or a time interval Δt which is reserved for avoiding the interference caused by RN uplink transmission, and the ΔT is the switch time that the RN requires to switch from an uplink reception state to an uplink transmission state and/or from the uplink transmission state to the uplink reception state; and
the RN coding the backhaul UCI into a Q=Q'×$Q_m$ bits sequence, wherein $Q_m$ is the number of bits comprised in each coded modulation symbol in a modulation order of a backhaul uplink subframe.

2. The method according to claim 1, wherein when the UCI is ACK/NACK or Rank Indication (RI) information, determining the Q' according to the SC-FDMA occupied by the GP comprises:
determining the number of the SC-FDMA symbols $N_{symb}^{R-PUSCH-initial}$ capable of bearing uplink service data on initial backhaul uplink subframe transmission according to the number of the SC-FDMA symbols occupied by the GP; and
determining the Q', $$Q' = \min\left(\left\lceil \frac{O \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, 4 \cdot M_{sc}^{R-PUSCH}\right),$$

wherein O is the number of bits of the ACK/NACK or the RI information; $M_{SC}^{R-PUSCH}$ is the number of sub-carriers of relay physical uplink shared channel (R-PUSCH) resource obtained by the RN for bearing a transmission block (TB) that bears uplink service data on a current uplink subframe; $M_{SC}^{R-PUSCH-initial}$ is the number of the sub-carriers of the R-PUSCH resource allocated for the TB that bears the uplink service data in initial uplink subframe transmission; $K_r$ is the number of bits contained in a corresponding code block r in code block segmentation performed for the TB that bears the uplink service data; C is the total number of coded blocks after the code block segmentation performed for the TB that bears the uplink service data; and $\beta_{offset}^{R-PUSCH}$ is an offset indication of a UCI coding mode of a backhaul link.

3. The method according to claim 1, wherein when the UCI is Channel Quality Indicator/Precoding Matrix Indicator (CQI/PMI) information, determining the Q' according to the number of the SC-FDMA symbols occupied by the GP comprises:
determining the number of the SC-FDMA symbols $N_{symb}^{R-PUSCH-initial}$ capable of bearing uplink service data on initial backhaul uplink subframe transmission according to the number of the SC-FDMA symbols occupied by the GP; determining the number of the SC-FDMA symbols $N_{symb}^{R-PUSCH}$ capable of bearing the uplink service data on a current backhaul uplink subframe according to the number of the SC-FDMA symbols occupied by the GP; and
determining the Q', $$Q' = \min\left(\left\lceil \frac{(O+L) \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, M_{sc}^{R-PUSCH} \cdot N_{symb}^{R-PUSCH} - \frac{Q_{RI}}{Q_m}\right),$$

wherein O is the number of bits of the CQI/PMI information; L is the number of bits of a cyclic redundancy check (CRC) contained in a coded CQI/PMI information; $M_{SC}^{R-PUSCH}$ is the number of sub-carriers of R-PUSCH resource obtained by the RN for bearing a TB that bears uplink service data on a current uplink subframe; $M_{SC}^{R-PUSCH-initial}$ is the number of the sub-carriers of the R-PUSCH resource allocated for the TB that bears the uplink service data in initial uplink subframe transmission; $K_r$ is the number of bits contained in a corresponding code block r in code block segmentation performed for the TB that bears the uplink service data; C is the total number of coded blocks after the code block segmentation for the TB that bears the uplink service data; $Q_{RI}$ is the number of coded bits of RI information of a backhaul link; and $\beta_{offset}^{R-PUSCH}$ is an offset indication of a UCI coding mode of the backhaul link.

4. The method according to claim 2, wherein determining the $N_{symb}^{R-PUSCH-initial}$ according to the number of the SC-FDMA symbols occupied by the GP comprises:
$N_{symb}^{R-PUSCH-initial}=(2\cdot(N_{symb}^{UL}-1)-N_{SRS}-N_{GP})$,
wherein in the initial uplink subframe transmission, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by a Sounding Reference Signal (SRS) and is equal to 0 or 1.

5. The method according to claim 3, wherein determining the $N_{symb}^{R-PUSCH}$ according to the SC-FDMA symbols occupied by the GP comprises:
$N_{symb}^{R-PUSCH-initial}=(2\cdot(N_{symb}^{UL}-1)-N_{SRS}-N_{GP})$,
wherein in a current backhaul uplink subframe, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by a SRS and is equal to 0 or 1.

6. The method according to claim 4, wherein the value range of the $N_{GP}$ is $[N_1, \ldots N_i, \ldots N_n]$, wherein $i=1, \ldots, n$, $0 \leq n \leq 13$, and $0 \leq N_i \leq 13$.

7. The method according to claim 5, wherein the value range of the $N_{GP}$ is $[N_1, \ldots N_i, \ldots N_n]$, wherein $i=1, \ldots, n$, $0 \leq n \leq 13$, and $0 \leq N_i \leq 13$.

8. A method for processing backhaul Uplink Control Information (UCI), comprising:
an evolved NodeB (eNB) indicating a Relay Node (RN) an offset indication index $I_{R-offset}$ of a UCI coding mode of a backhaul link by a high-layer signalling, wherein the $I_{R-offset}$ contains M values, and M=2 or 4 or 8;
the RN determining the value of an offset indication $\beta_{offset}^{R-PUSCH}$ of the UCI coding mode of the backhaul link corresponding to the $I_{R-offset}$ in an index reference table;
the RN determining Q' which is the number of coded modulation symbols of the backhaul UCI according to the value of the $\beta_{offset}^{R-PUSCH}$; and
the RN coding the backhaul UCI into a Q =Q'×$Q_M$ bits sequence, wherein $Q_M$ is the number of bits comprised in each coded modulation symbol in a modulation order of a backhaul uplink subframe.

9. The method according to claim 8, wherein the backhaul UCI comprises at least one of: ACK/NACK, Rank Indication (RI), and Channel Quality Indicator/Precoding Matrix Indicator (CQI/PMI).

10. The method according to claim 9, wherein the UCI of the ACK/NACK, the UCI of the RI and the UCI of the CQI/PMI correspond to an index reference table respectively.

11. A Relay Node (RN), comprising: a hardware processor configured to execute program modules stored on a memory, the program modules comprising:
a determination module, configured to determine Q' which is the number of coded modulation symbols of backhaul Uplink Control Information (UCI) according to the number of Single Carrier-Frequency Division Multiple Access (SC-FDMA) symbols occupied by a Guard Period (GP), wherein the GP comprises a RN state switch time ΔT and/or a time interval Δt which is reserved for avoiding the interference caused by RN uplink transmission, and the ΔT is switch time that the RN requires to switch from an uplink reception state to an uplink transmission state and/or from the uplink transmission state to the uplink reception state; and
a coding module, configured to codes the backhaul UCI into a Q=Q'×$Q_M$ bits sequence, wherein $Q_M$ is the number of bits comprised in each coded modulation symbol in a modulation order of a backhaul uplink subframe.

12. The RN according to claim 11, wherein when the UCI is ACK/NACK or Rank Indication (RI) information, the determination module comprises:
a first determination module, configured to determine the number of the SC-FDMA symbols $N_{symb}^{R-PUSCH-initial}$ capable of bearing uplink service data on initial backhaul uplink subframe transmission according to the number of the SC-FDMA symbols occupied by the GP; and
a second determination module, configured to determine the Q', $$Q' = \min\left(\left\lceil \frac{O \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, 4 \cdot M_{sc}^{R-PUSCH}\right),$$

wherein O is the number of bits of the ACK/NACK or the RI information; $M_{SC}^{R-PUSCH}$ is the number of sub-carriers of relay physical uplink shared channel (R-PUSCH) resource obtained by the RN for bearing a transmission block (TB) that bears uplink service data on a current uplink subframe; $M_{SC}^{R-PUSCH-initial}$ is the number of the sub-carriers of the R-PUSCH resource allocated for the TB that bears the uplink service data in initial uplink subframe transmission; $K_r$ is the number of bits contained in a corresponding code block r in code block segmentation performed for the TB that bears the uplink service data; C is the total number of coded blocks after the code block segmentation performed for the TB that bears the uplink service data TB; and $\beta_{offset}^{R-PUSCH}$ is an offset indication of a UCI coding mode of a backhaul link.

13. The RN according to claim 12, wherein the first determination module is configured to determine $N_{symb}^{R-PUSCH-initial}=(2\cdot(N_{symb}^{UL}-1)-N_{SRS}-N_{GP})$, wherein in the initial uplink subframe transmission, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by the Sounding Reference Signal (SRS) and is equal to 0 or 1.

14. The RN according to claim 11, wherein when the UCI is Channel Quality Indicator/Precoding Matrix Indicator (CQI/PMI) information, the determination module comprises:
a third determination module, configured to determine the number of the SC-FDMA symbols $N_{symb}^{R-PUSCH-initial}$ capable of bearing uplink service data on initial backhaul uplink subframe transmission according to the number of the SC-FDMA symbols occupied by the GP; and determine the number of the SC-FDMA symbols $N_{symb}^{R-PUSCH-initial}$ capable of bearing the uplink service data on a current backhaul uplink subframe according to the number of the SC-FDMA symbols occupied by the GP; and a fourth determination module, configured to determine the Q', $$Q' = \min\left(\left\lceil \frac{(O+L) \cdot M_{sc}^{R-PUSCH-initial} \cdot N_{symb}^{R-PUSCH-initial} \cdot \beta_{offset}^{R-PUSCH}}{\sum_{r=0}^{C-1} K_r} \right\rceil, M_{sc}^{R-PUSCH} \cdot N_{symb}^{R-PUSCH} - \frac{Q_{RI}}{Q_m}\right)$$

wherein O is the number of bits of the CQI/PMI information; L is the number of bits of a cyclic redundancy check (CRC) contained in a coded CQI/PMI information; $M_{sc}^{R-PUSCH}$ is the number of sub-carriers of R-PUSCH resource obtained by the RN for bearing a TB that bears the uplink service data on a current uplink subframe; $M_{SC}^{R-PUSCH-initial}$ is the number of the sub-carriers of the R-PUSCH resource allocated for the TB that bears the uplink service data in initial uplink subframe transmission; $K_r$ is the number of bits contained in a corresponding code block r in code block segmentation performed for the TB that bears the uplink service data; C is the total number of coded blocks after the code block segmentation performed for the TB that bears the uplink service data; $Q_{RI}$ is the number of bits of coded RI information of a backhaul link; and $\beta_{offset}^{R-PUSCH}$ is an offset indication of a UCI coding mode of the backhaul link.

15. The RN according to claim 14, wherein the third determination module is configured to perform processes of:

determining $N_{symb}^{R-PUSCH-initial}=(2 \cdot (N_{symb}^{UL}-1)-N_{SRS}-N_{GP})$, wherein in the initial uplink subframe transmission, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by the Sounding Reference Signal (SRS) and is equal to 0 or 1; and determining $N_{symb}^{R-PUSCH}=(219 \ (N_{symb}^{UL}-1)-N_{SRS}-N_{GP})$, wherein in a current backhaul uplink subframe, $N_{GP}$ is the number of the SC-FDMA symbols occupied by the GP; $N_{symb}^{UL}$ is the number of the SC-FDMA symbols on each slot of the uplink subframe; and $N_{SRS}$ is the number of the SC-FDMA symbol occupied by the SRS and is equal to 0 or 1.

16. The method according to claim 3, wherein determining the $N_{symb}^{R-PUSCH-initial}$ according to the number of the SC-FDMA symbols occupied by the GP comprises:

$N_{symb}^{R-PUSCH-initial}=(2 \cdot (N_{symb}^{UL}-1)-N_{SRS}-N_{GP})$, wherein in the initial uplink subframe transmission, $N_{GP}$ is the number of the SC-FDMA symbols occupied by the GP; $_{symb}^{UL}$ is the number of the SC-FDMA symbols on each slot of the uplink subframe; and $N_{SRS}$ is the number of the SC-FDMA symbol occupied by a Sounding Reference Signal (SRS) and is equal to 0 or 1.

17. The method according to claim 16, wherein the value range of the $N_{GP}$ is $[N_1, \ldots N_i, N_n]$, wherein i=1, ..., n, 0≤n≤13, and 0≤$N_i$≤13.

* * * * *